(12) United States Patent
Tobita

(10) Patent No.: US 10,477,143 B2
(45) Date of Patent: *Nov. 12, 2019

(54) INFORMATION PROCESSING DEVICE, INFORMATION PROCESSING METHOD, AND TERMINAL DEVICE

(71) Applicant: SONY CORPORATION, Tokyo (JP)

(72) Inventor: Hiroaki Tobita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,745

(22) Filed: Jan. 4, 2018

(65) Prior Publication Data

US 2018/0131901 A1    May 10, 2018

Related U.S. Application Data

(63) Continuation of application No. 15/314,504, filed as application No. PCT/JP2015/063553 on May 12, 2015, now Pat. No. 9,894,317.

(51) Int. Cl.
*H04N 7/14* (2006.01)
*G06K 9/00* (2006.01)
(Continued)

(52) U.S. Cl.
CPC ......... *H04N 7/147* (2013.01); *G06K 9/00671* (2013.01); *G06K 9/00718* (2013.01); *G06K 9/2063* (2013.01); *H04N 5/23206* (2013.01)

(58) Field of Classification Search
CPC combination set(s) only.
See application file for complete search history.

(56) References Cited

U.S. PATENT DOCUMENTS

2010/0010673 A1    1/2010 Wang et al.
2012/0239196 A1    9/2012 Olivier, III et al.
(Continued)

FOREIGN PATENT DOCUMENTS

CN    102089751 A    6/2011
CN    103718125 A    4/2014
(Continued)

OTHER PUBLICATIONS

International Search Report and Written Opinion of PCT Application No. PCT/JP2015/063553, dated Aug. 11, 2015, 06 pages of English Translation and 06 pages of ISRWO.

(Continued)

*Primary Examiner* — Phung-Hoang J Nguyen
(74) *Attorney, Agent, or Firm* — Chip Law Group

(57) ABSTRACT

Provided is an information processing device, including: a camera that captures a real space; a communication unit that communicates with a terminal device used by a remote user; a streaming control unit that streams a first video captured by the camera from the communication unit to the terminal device if the information processing device itself is selected by the remote user from among a plurality of devices that capture the real space; and a display that displays a user image of the remote user while the first video is being streamed to the terminal device. The information processing device reduces inconvenience for the remote user during remote communication, and realizes rich remote communication with a higher degree of freedom.

9 Claims, 18 Drawing Sheets

(51) Int. Cl.
*H04N 5/232* (2006.01)
*G06K 9/20* (2006.01)

(56) References Cited

U.S. PATENT DOCUMENTS

| | | | |
|---|---|---|---|
| 2012/0274736 A1* | 11/2012 | Robinson | H04N 7/15 348/14.16 |
| 2012/0281092 A1 | 11/2012 | Olivier et al. | |
| 2013/0035790 A1 | 2/2013 | Olivier, III et al. | |
| 2013/0208123 A1* | 8/2013 | Lakhani | H04N 7/18 348/159 |
| 2013/0265378 A1 | 10/2013 | Abuan et al. | |
| 2014/0156078 A1* | 6/2014 | Herzog | B25J 5/00 700/259 |
| 2018/0131901 A1* | 5/2018 | Tobita | G06K 9/00718 |

FOREIGN PATENT DOCUMENTS

| | | |
|---|---|---|
| EP | 2300930 A1 | 3/2011 |
| EP | 2740013 A1 | 6/2014 |
| JP | 2008-306327 A | 12/2008 |
| JP | 2011-528570 A | 11/2011 |
| JP | 2014-522053 A | 8/2014 |
| KR | 10-2011-0042269 A | 4/2011 |
| KR | 10-2014-0053149 A | 5/2014 |
| WO | 2008/106088 A2 | 9/2008 |
| WO | 2010/006211 A1 | 1/2010 |
| WO | 2013/019402 A1 | 2/2013 |

OTHER PUBLICATIONS

Notice of Allowance for U.S. Appl. No. 15/314,504, dated Oct. 3, 2017, 07 pages.

Non-Final Office Action for U.S. Appl. No. 15/314,504, dated Jun. 21, 2017, 05 pages.

International Preliminary Report on Patentability of PCT Application No. PCT/JP2015/063553, dated Dec. 20 2016, 07 pages of English Translation and 03 pages of IPRP.

* cited by examiner

FIG. 13

| DEVICE ID | NAME | TYPE | FUNCTIONALITY | ADDRESS | POSITION | ACCESS RIGHTS | STATUS |
|---|---|---|---|---|---|---|---|
| DEV_A | Electronic Chalkboard | Stationary | ... | ... | (x1, y1, z1) | All Users | Active |
| DEV_C | Smart Phone | Portable | ... | ... | (x3, y3, z3) | All Users | Active |
| DEV_F | Talking Head | Mobile | ... | ... | (x6, y6, z6) | Group A | Idle |
| ... | ... | ... | ... | ... | ... | ... | ... |

LOCAL DEVICE DATA

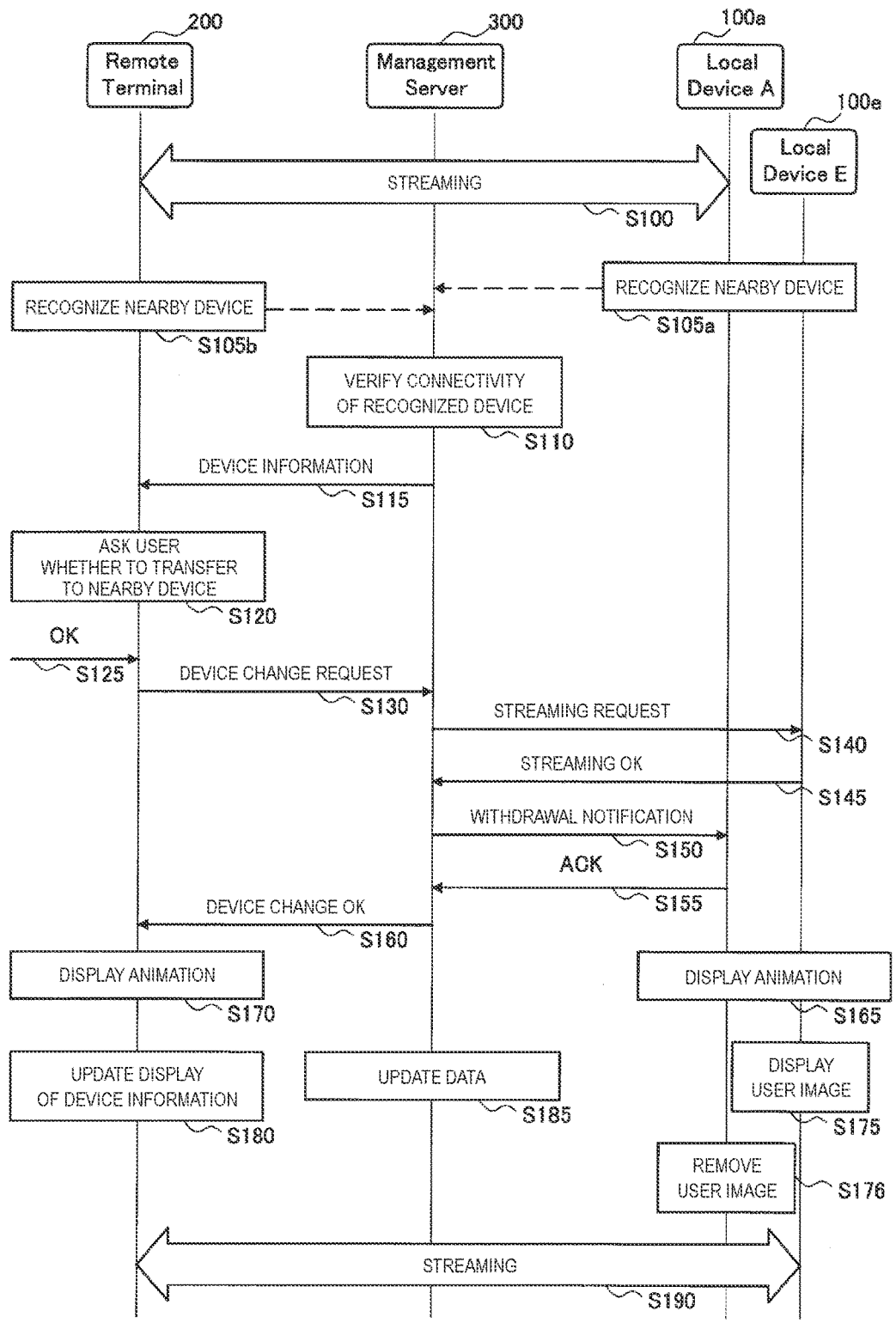

INFORMATION PROCESSING DEVICE, INFORMATION PROCESSING METHOD, AND TERMINAL DEVICE

CROSS-REFERENCE TO RELATED APPLICATION

The present application is a continuation application of U.S. patent application Ser. No. 15/314,504, filed Nov. 28, 2016, which is a national stage entry of PCT/JP2015/063553, filed May 12, 2015, which claims priority from prior Japanese Priority Patent Application JP 2014-123564 filed in the Japan Patent Office on Jun. 16, 2014, the entire contents of which are hereby incorporated by reference.

TECHNICAL FIELD

The present disclosure relates to an information processing device, an information processing method, and a terminal device.

BACKGROUND ART

Recently, communication tools for remote communication are being utilized in a variety of fields, such as business, education, and amusement. One representative example of such communication tools is a videoconferencing system (for example, see Patent Literature 1 below). In communication through a videoconferencing system, a local user present in a local environment in which the system is installed and a remote user present in a remote location participate. Additionally, the system streams a video of the local environment to the remote user's terminal device. Other examples of communication tools for remote communication are videophones and video chat.

CITATION LIST

Patent Literature

Patent Literature 1: JP 2008-306327A

SUMMARY OF INVENTION

Technical Problem

With existing communication tools, in many cases, the camera in the local environment is set by the local user, and is installed semi-permanently. If the remote user is approved to participate in the communication, the remote user is able to view a video of the local environment. However, the remote user is unable to move around in the local environment, and both the remote user's field of view and actions in the local environment are constrained greatly by the setup of the system.

Accordingly, an objective of technology according to the present disclosure is to reduce inconvenience for the remote user discussed above during remote communication, and realize rich remote communication with a higher degree of freedom.

Solution to Problem

According to the present disclosure, there is provided an information processing device, including: a camera that captures a real space; a communication unit that communicates with a terminal device used by a remote user; a streaming control unit that streams a first video captured by the camera from the communication unit to the terminal device if the information processing device itself is selected by the remote user from among a plurality of devices that capture the real space; and a display that displays a user image of the remote user while the first video is being streamed to the terminal device.

According to the present disclosure, there is provided an information processing method executed by an information processing device provided with a camera that captures a real space and a communication unit that communicates with a terminal device used by a remote user, the information processing method including: streaming a first video captured by the camera from the communication unit to the terminal device if the information processing device itself is selected by the remote user from among a plurality of devices that capture the real space; and displaying a user image of the remote user on a display while the first video is being streamed to the terminal device.

According to the present disclosure, there is provided a terminal device, including: a communication unit that communicates with a plurality of devices that respectively capture a real space; a streaming control unit that plays back a first video depicting the real space streamed from a device selected by a remote user using the terminal device from among the plurality of devices; and a device control unit that causes a display of the selected device to display a user image of the remote user while the first video is being played back by the streaming control unit.

According to the present disclosure, there is provided an information processing method executed by a terminal device provided with a communication unit that communicates with a plurality of devices that respectively capture a real space, the information processing method including: playing back a first video depicting the real space streamed from a device selected by a remote user using the terminal device from among the plurality of devices; and causing a display of the selected device to display a user image of the remote user while the first video is being played back.

Advantageous Effects of Invention

According to technology according to the present disclosure, inconvenience is reduced for the remote user during remote communication, and rich remote communication with a higher degree of freedom is realized. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is an explanatory diagram illustrating an example of a structure of local device data managed on a management server.

FIG. 16 is a sequence diagram illustrating an example of a flow of information processing when a remote user transfers from a local device to a nearby device.

DESCRIPTION OF EMBODIMENT(S)

Figure 1:
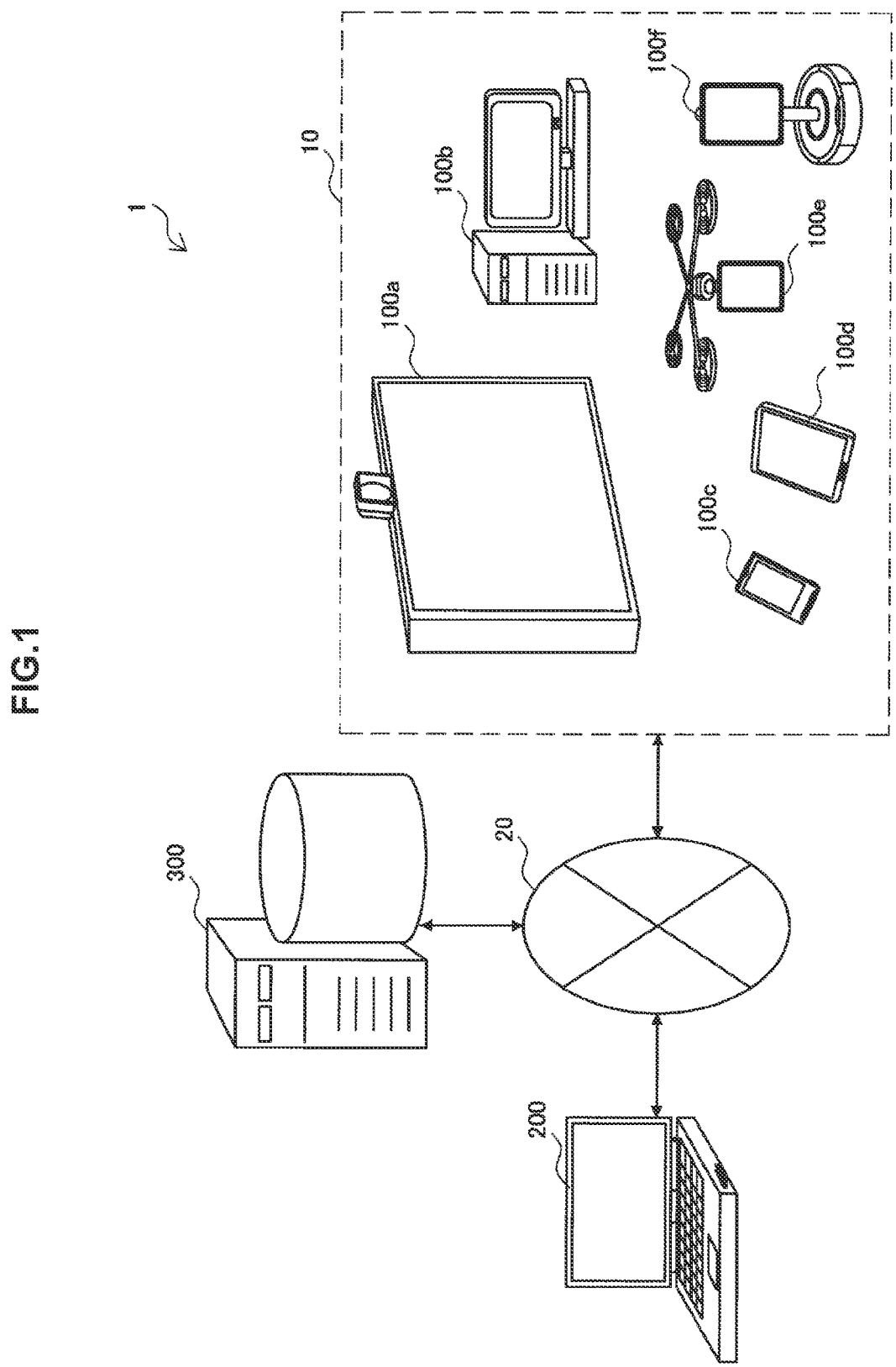
FIG. 1 is an explanatory diagram for describing an overview of an information processing system according to an embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, the description will proceed in the following order.
1. Overview of system
   1-1. Overview
   1-2. Local environment
2. Example configuration of devices
   2-1. Local device
   2-2. Remote terminal
   2-3. Management server
3. Process flows
   3-1. Login to system
   3-2. Transfer between devices
4. Conclusion <1. Overview of System>

[1-1. Overview]

FIG. 1 is an explanatory diagram for describing an overview of an information processing system 1 according to an embodiment. Referring to FIG. 1, the information processing system 1 includes local devices 100a, 100b, 100c, 100d, 100e, and 100f present in a local environment 10, a network 20, a remote terminal 200, and a management server 300.

The local environment 10 may be an arbitrary environment in a real space where real objects may exist. Communication between users in the information processing system 1 is conducted in the local environment 10. The local environment 10 may be installed in a variety of locations, such as an office, a laboratory, a conference hall, a school, a shopping mall, an amusement park, or a home, for example.

Each of the local devices 100a, 100b, 100c, 100d, 100e, and 100f is an information processing device existing in the local environment 10. The local device 100a is an electronic chalkboard. The local device 100b is a desktop personal computer (PC). The local device 100c is a smartphone. The local device 100d is a tablet PC. The local device 100e is a quadcopter. The local device 100f is a talking head. Note that in the following description of this specification, when the local devices 100a, 100b, 100c, 100d, 100e, and 100f are not being distinguished from each other, these devices will be collectively referred to as the local device 100 by omitting the trailing letters in the reference signs. This applies similarly to the other structural elements.

Each local device 100 is equipped at least with a camera and a communication interface. Each local device 100 includes a function of capturing a video of a real space using the camera, and streaming the captured video of the real space. Furthermore, each local device 100 may also stream audio picked up through a microphone. Streaming data from each local device 100 may be delivered to the remote terminal 200 directly, or relayed to the remote terminal 200 via the management server 300. FIG. 1 illustrates six local devices 100, but the information processing system 1 may include fewer or more local devices 100 of arbitrary types.

The network 20 interconnects the local device 100, the remote terminal 200, and the management server 300. The network 20 may be a network of any type, such as the Internet, a corporate intranet, a home network, or a personal network. The network 20 may be a wired network, a wireless network, or a combination of the two. The network 20 may also include one or more pieces of network equipment (not illustrated), such as a wireless access point, a router, a switch, a repeater, or a bridge.

The remote terminal 200 is a terminal device used by the remote user. The remote terminal 200 receives video data (and audio data) streamed over the network 20 from any local device 100 existing in the local environment 10, and plays back a video (and audio) of the real space in the local environment 10. In the present embodiment, the local device 100 acting as the streaming source is designated the streaming source device. The streaming source device typically is selected by the remote user. Although FIG. 1 illustrates only one remote terminal 200, the information processing system 1 may also include more remote terminals 200.

The management server 300 is an information processing device that manages streaming between the local device 100 and the remote terminal 200 in the information processing system 1. The management server 300 includes a database that stores device data for each of the local devices 100 (hereinafter designated local device data), for example. The local device data may be provided to the remote terminal 200 to support the selection of a device by the remote user. Additionally, the management server 300 may also include a database that stores user data about the remote user (hereinafter designated remote user data). Note that the management server 300 may also be omitted from the configuration of the information processing system 1. In this case, the local device data and the remote user data may be managed in a centralized manner by one of the local devices 100 or the remote terminal 200, or managed in a distributed manner by the respective devices.

When an existing communication tool like a videoconferencing system is used, typically, a camera and a display are installed in the local environment. The setup of the camera and the display may be performed by a local user. The setup of these devices may allow for dynamic control such as pan, tilt, and zoom, for example, but ordinarily, the setup is semi-permanent. The remote user is unable to move around in the local environment. Consequently, the remote user's field of view and actions in the local environment are constrained greatly by the setup of these devices.

In contrast, in the present embodiment, a plurality of the local device 100 discussed above is installed in the local environment 10. The remote user is able to access any freely selectable local device 100 via the remote terminal 200, and view the video from the selected local device 100, or in other words, the streaming source device. The selection of the streaming source device may be changed even in the middle of communication. On the display of the selected streaming source device, a user image of the remote user (such as a photograph of the user or a character image enabling the remote user to be identified, for example) is displayed. For this reason, by viewing the user image displayed by the local device 100, the local user is able to recognize which remote user is residing in which device (that is, which device from which the remote user is viewing a video). The user image may also be a moving image. In one working example, the local user is also notified of a change in the selection of the streaming source device by the remote user through a symbolic animation displayed on the display.

[1-2. Local Environment]

Figure 2:
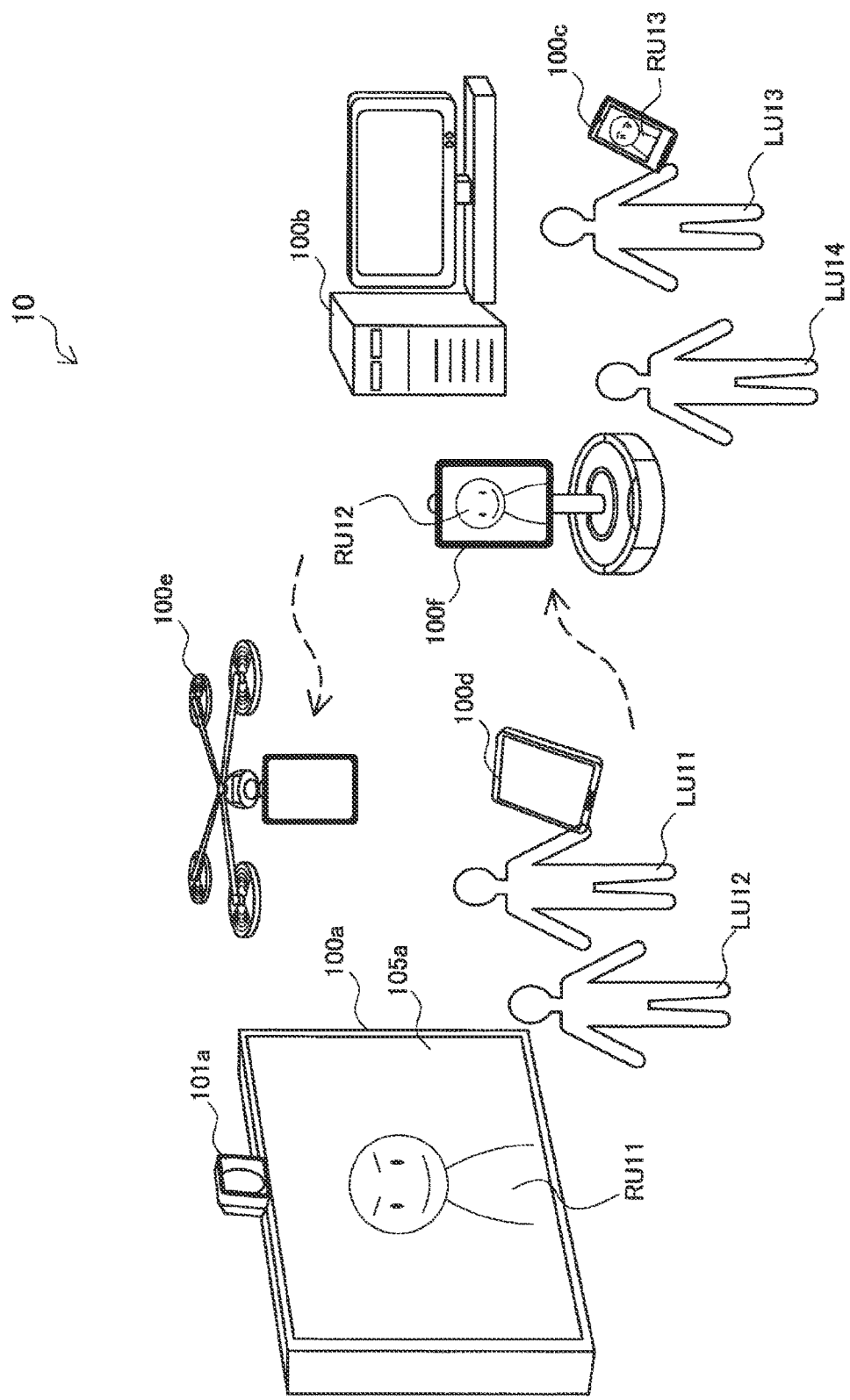
FIG. 2 is an explanatory diagram for describing an example of a local environment of the information processing system illustrated as an example in FIG. 1.

FIG. 2 is an explanatory diagram for describing an example of the local environment 10 of the information processing system 1 illustrated as an example in FIG. 1. Referring to FIG. 2, a local device 100a is installed in the local environment 10. The local device 100a includes a camera 101a and a display 105a. Local users LU11 and LU12 are gathered in front of the local device 100a. Also, a user image of a remote user RU11 is being displayed on the display 105a of the local device 100a. The remote user RU11 is able to converse with the local users LU11 and LU12 through a microphone and a speaker (not illustrated) of the local device 100a.

Local users LU13 and LU14 are gathered in front of a local device 100b. The local user LU13 is holding a local device 100c. A local device 100f is moving in front of the local device 100b. A user image of a remote user RU12 is being displayed on a display of the local device 100f. A user image of a remote user RU13 is being displayed on a display of the local device 100c. The remote users RU12 and RU13 are able to converse with the local users LU13 and LU14 through the local devices 100f and 100c, respectively.

A local device 100d is being held by the local user LU11. Also, a local device 100e is flying in front of the local device 100a. These local devices 100d and 100e may be captured by the camera 101a of the local device 100a. The remote user RU11 recognizes the presence of the local devices 100d and 100e through the video streamed from the local device 100a. At this point, suppose that in one scenario, the remote user RU11 selects the local device 100d as the new streaming source device. Subsequently, the remote user RU11 transfers to the local device 100d (in actuality, the remote user RU11 still remains at the remote location, but the display of the user image of the remote user RU11 moves to the display of the local device 100d). In this state, by having the local user LU11 carry around the local device 100d, the remote user RU11 may move around the local environment 10 virtually. Additionally, suppose that in another scenario, the remote user RU11 selects the local device 100e as the new streaming source device. Subsequently, the remote user RU11 transfers to the local device 100e (in actuality, the remote user RU11 still remains at the remote location, but the display of the user image of the remote user RU11 moves to the display of the local device 100e). In this state, the remote user RU11 remotely operates the local device 100e, and thus the remote user RU11 may move around the local environment 10 virtually. For example, after virtually moving in front of the local device 100b, the remote user RU11 may participate in conversations with the local users LU13 and LU14 as well as the remote users RU12 and RU13.

<2. Example Configuration of Devices>

Next, configurations of the various devices discussed above that constitute the information processing system 1 will be described in detail.

[2-1. Local Device]

Figure 3A:
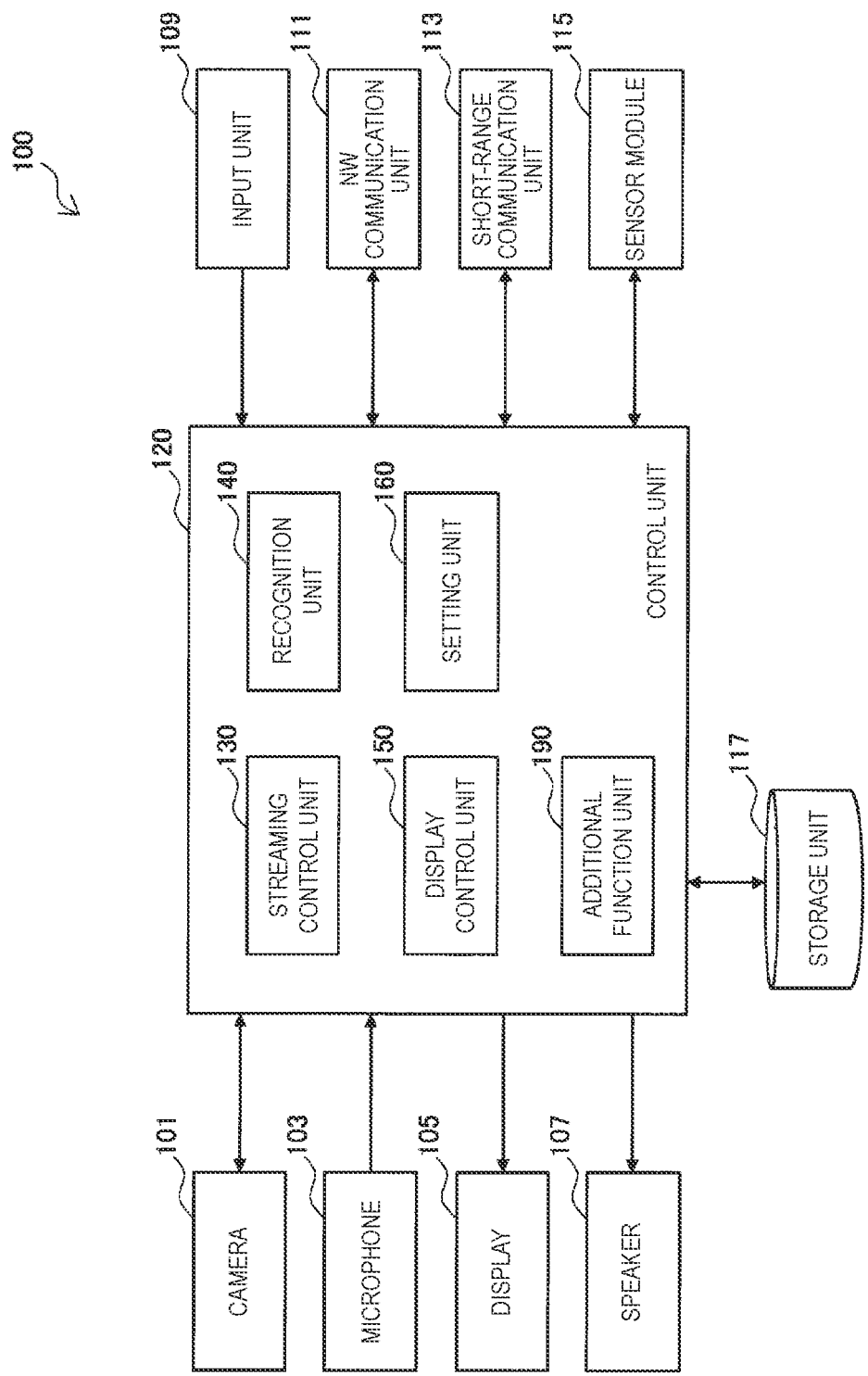
FIG. 3A is a block diagram illustrating an example of a configuration of a local device configured as a stationary device.

The local devices 100a and 100b are stationary devices installed semi-permanently (that is, the devices ordinarily do not move in the middle of remote communication). FIG. 3A is a block diagram illustrating an example of a configuration of the local device 100 configured as a stationary device. Referring to FIG. 3A, the local device 100 is equipped with a camera 101, a microphone 103, a display 105, a speaker 107, an input unit 109, a network (NW) communication unit 111, a short-range communication unit 113, a sensor module 115, a storage unit 117, and a control unit 120. The control unit 120 may function as a streaming control unit 130, a recognition unit 140, a display control unit 150, a setting unit 160, and an additional function unit 190. A stationary device is not limited to the examples illustrated in FIGS. 1 and 2, and may also be another type of device, such as a television device, digital signage, or a navigation device, for example.

Figure 3B:
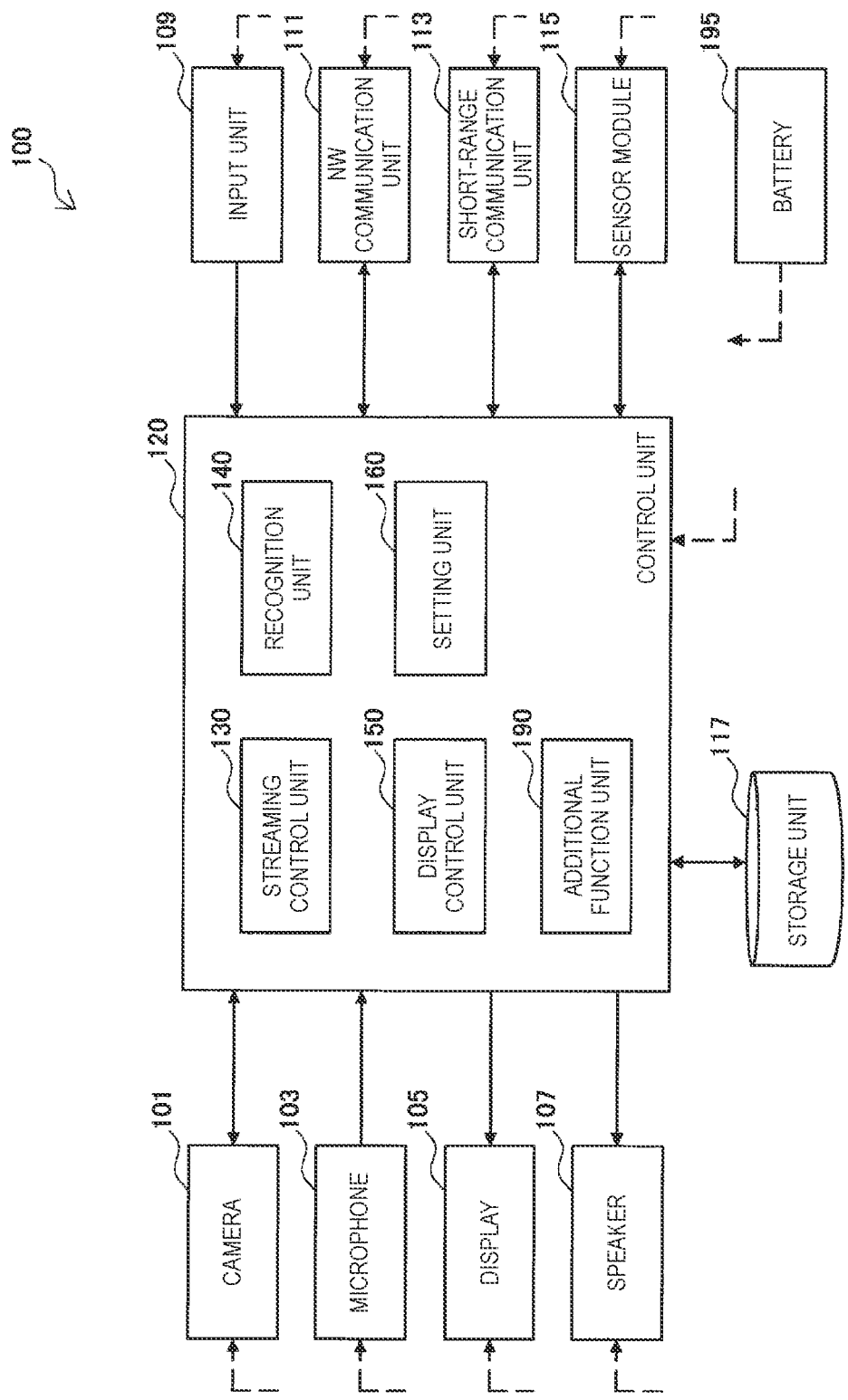
FIG. 3B is a block diagram illustrating an example of a configuration of a local device configured as a portable device.
Figure 4A:
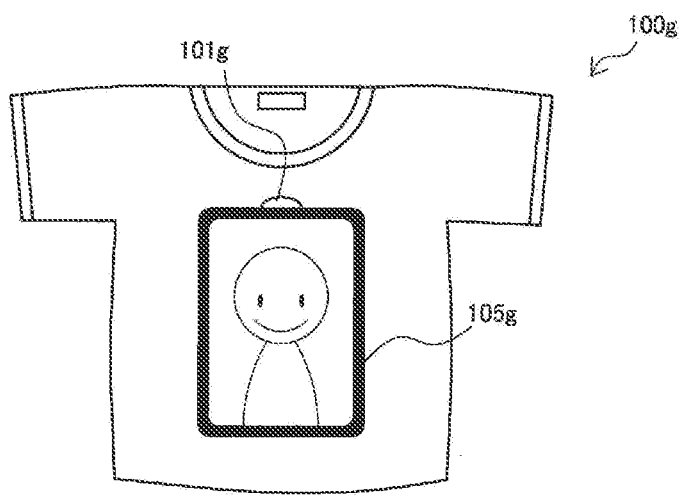
FIG. 4A is an explanatory diagram illustrating an additional example of a portable device.

The local devices 100c and 100d are portable devices carried around by local users. FIG. 3B is a block diagram illustrating an example of a configuration of the local device 100 configured as a portable device. Referring to FIG. 3B, the local device 100 is equipped with a battery 195 in addition to the block group illustrated in FIG. 3A. A portable device is not limited to the examples illustrated in FIGS. 1 and 2, and may also be another type of device, such as a notebook PC, a personal digital assistant (PDA), or a game console, for example. FIG. 4A is an explanatory diagram illustrating an additional example of a portable device. Referring to FIG. 4A, a local device 100g is a wearable device in the shape of a T-shirt equipped with a camera 101g and a display 105g. The local device 100g is worn by a local user, and may move around the local environment together with that local user.

Figure 3C:
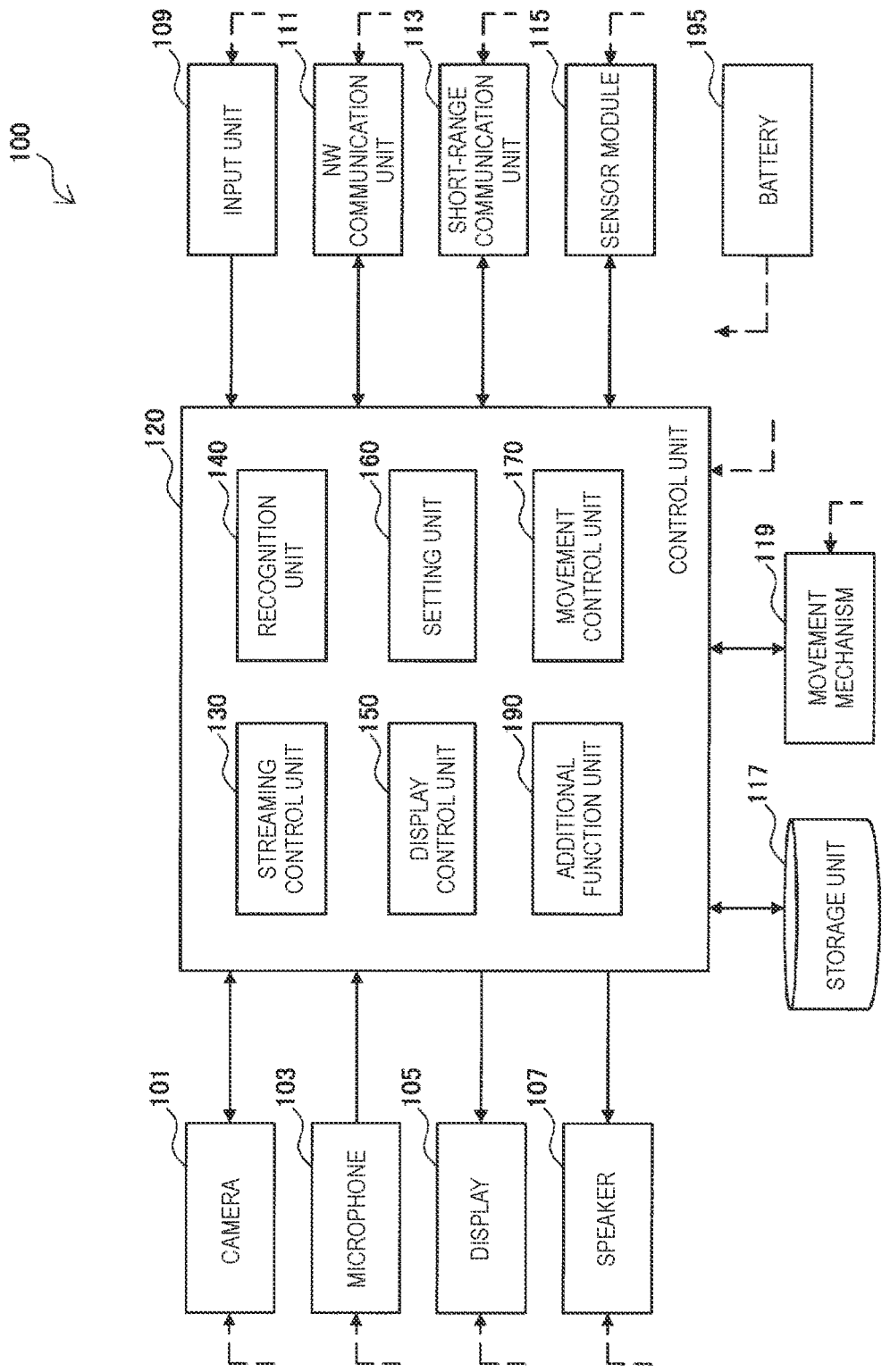
FIG. 3C is a block diagram illustrating an example of a configuration of a local device configured as a mobile device.
Figure 4B:
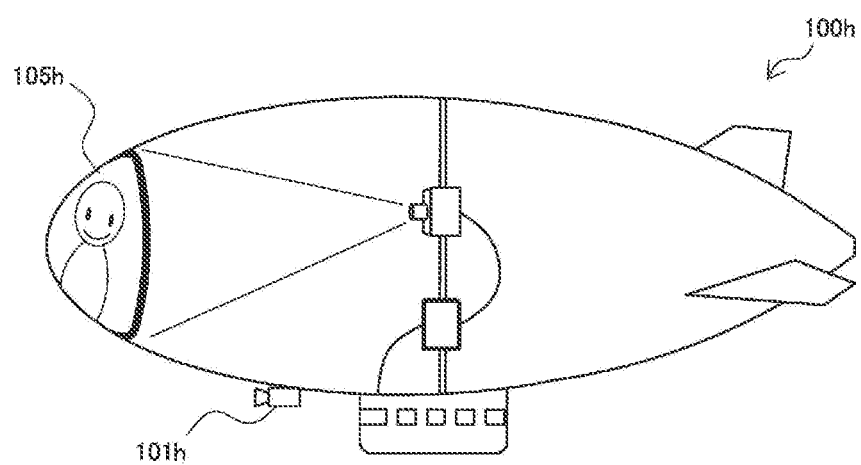
FIG. 4B is an explanatory diagram illustrating an additional example of a mobile device.
Figure 4C:
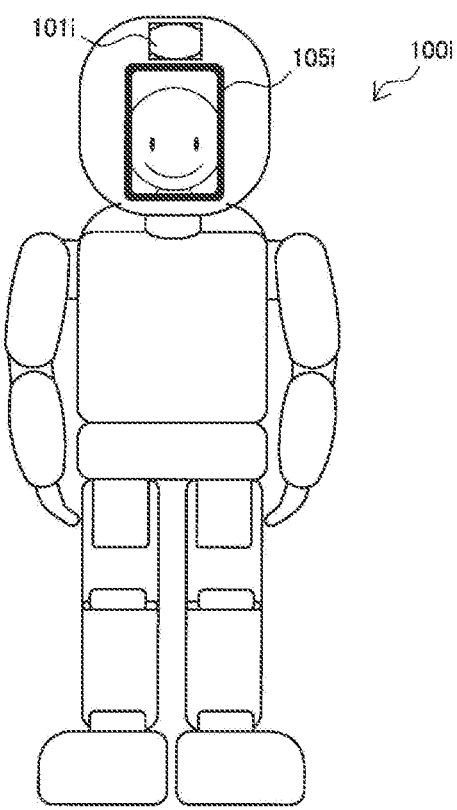
FIG. 4C is an explanatory diagram illustrating an additional example of a mobile device.
Figure 4D:
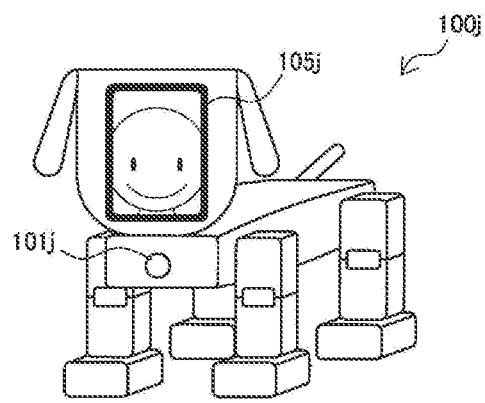
FIG. 4D is an explanatory diagram illustrating an additional example of a mobile device.

The local devices 100e and 100f are mobile devices that move under operation by a remote user or autonomously. FIG. 3C is a block diagram illustrating an example of a configuration of the local device 100 configured as a mobile device. Referring to FIG. 3C, the local device 100 is equipped with a movement mechanism 119 in addition to the block group illustrated in FIG. 3B. The control unit 120 may function additionally as a movement control unit 170. A mobile device is not limited to the examples illustrated in FIGS. 1 and 2, and may also be another type of device. FIGS. 4B, 4C, and 4D are explanatory diagrams each illustrating an additional example of a mobile device. Referring to FIG. 4B, a local device 100h is an airship equipped with a camera 101h and a display 105h. Referring to FIG. 4C, a local device 100i is a humanoid robot equipped with a camera 101i and a display 105i. Referring to FIG. 4D, a local device 100j is a pet robot equipped with a camera 101j and a display 105j.

(1) Camera

The camera 101 includes an image sensor such as a charge-coupled device (CCD) or complementary metal-oxide-semiconductor (CMOS) sensor, and captures images. A series of images captured by the camera 101 constitutes a video. The camera 101 outputs a video signal expressing the captured video (typically a video depicting the real space of the local environment 10) to the control unit 120.

(2) Microphone

The microphone 103 picks up audio emitted near the local device 100, and generates an audio signal. The microphone 103 may be a nondirectional microphone, or have directionality. The microphone 103 outputs the generated audio signal to the control unit 120.

(3) Display

The display 105 includes a screen realized by a liquid crystal display (LCD), organic light-emitting diodes (OLEDs), a cathode ray tube (CRT), or the like and a display circuit, and displays images under control by the display control unit 150 discussed later. The display 105 may also be a device such as a 3D display, a holographic display, or a volumetric display, instead of a 2D display that displays two-dimensional images.

(4) Speaker

The speaker 107 includes a diaphragm and circuit elements such as an amp, and outputs audio based on an audio signal input from the control unit 120.

(5) Input Unit

The input unit 109 is an input interface used in order for the local user to operate the local device 100 or input information into the local device 100. The input unit 109 may also include a touch sensor integrated with the display 105, for example. Instead of (or in addition to) the above, the input unit 109 may also include other types of input interfaces, such as buttons, switches, a keyboard, a pointing device, or a keypad. Additionally, the input unit 109 may also include a voice recognition module that detects user input based on voice commands, or a gesture recognition module that detects user input based on gesture commands.

(6) NW Communication Unit

The NW communication unit 111 is a communication interface that executes communication on the network 20. The NW communication unit 111 may be a wired communication interface that supports a wired communication protocol such as Ethernet. Alternatively, the NW communication unit 111 may be a wireless communication interface that supports a wireless communication protocol such as Long Term Evolution (LTE), Wideband Code Division Multiple Access (WCDMA), WiMAX, or wireless local area network (WLAN).

(7) Short-Range Communication Unit

The short-range communication unit 113 is a short-range communication interface that supports a short-range communication protocol such as near field communication (NFC), Bluetooth (registered trademark), TransferJet (registered trademark), or wireless USB. The short-range communication unit 113 executes communication with nearby devices positioned near the local device 100 in the local environment 10.

(8) Sensor Module

The sensor module 115 is a module that may include a sensor group, such as a positioning sensor, an acceleration sensor, a gyro sensor, and a geomagnetic sensor. The positioning sensor measures the current position of the local device 100 based on Global Positioning System (GPS) signals from GPS satellites, or wireless signals from wireless access points, for example. The acceleration sensor measures 3-axis acceleration imparted to the local device 100. The gyro sensor measures the rotation of the local device 100. The geomagnetic sensor measures the geographical orientation of the local device.

(9) Storage Unit

The storage unit 117 is realized with a storage medium such as semiconductor memory or a hard disk, and stores programs and data used in processing by the local device 100. The data stored by the storage unit 117 may include local device data about the local device 100, for example. Note that some of the programs and data described in this specification may also be acquired from an external data source (such as a data server, network storage, or externally attached memory, for example), rather than being stored in the storage unit 117.

(10) Movement Mechanism

The movement mechanism 119 is a means of movement that moves the mobile device, namely the local device 100, in real space, under control by the movement control unit 170 discussed later. For example, the movement mechanism 119 may include a motor and a propeller (in the case of a flying type such as a quadcopter or an airship), wheels or caterpillar tracks (in the case of a surface movement type such as a talking head), or walking actuators (in the case of a walking type such as a humanoid or pet robot).

(11) Control Unit

The controller 120 may be a processor such as a central processing unit (CPU) or a digital signal processor (DSP). The control unit 120 causes various functions of the local device 100 to operate by executing a program stored in the storage unit 117 or another storage medium.

(12) Streaming Control Unit

When the current device is selected from among multiple local devices that capture a real space as the streaming source device by a remote user, the streaming control unit 130 causes a video of the local environment 10 captured by the camera 101 to be streamed from the NW communication unit 111 to the remote terminal 200. The streaming data streamed to the remote terminal 200 may also include audio of the local environment 10 picked up by the microphone 103, in addition to the video of the local environment 10. The streaming control unit 130 may deliver the streaming data to the remote terminal 200 directly, or deliver the streaming data to the remote terminal 200 via the management server 300.

The streaming control unit 130 starts video streaming to the remote terminal 200 in response to a streaming request received from the management server 300 via the NW communication unit 111, for example. A streaming request may be received when a remote user logs in to the information processing system 1 and selects the local device 100 as the initial streaming source device. Additionally, a streaming request may also be received when the streaming source device is changed from a nearby device in the real space to the current device. Video streaming to the remote terminal 200 may be continued until a withdrawal notification, which means that the remote user is withdrawing from the current device, is received via the NW communication unit 111. A withdrawal notification may be received when the remote user logs out of the information processing system 1, or when the streaming source device is changed to a nearby device in real space, for example.

(13) Recognition Unit

The recognition unit 140 recognizes one or more nearby devices in the local environment 10 capturing video of the real space that may be streamed to the remote terminal 200.

Figure 5:
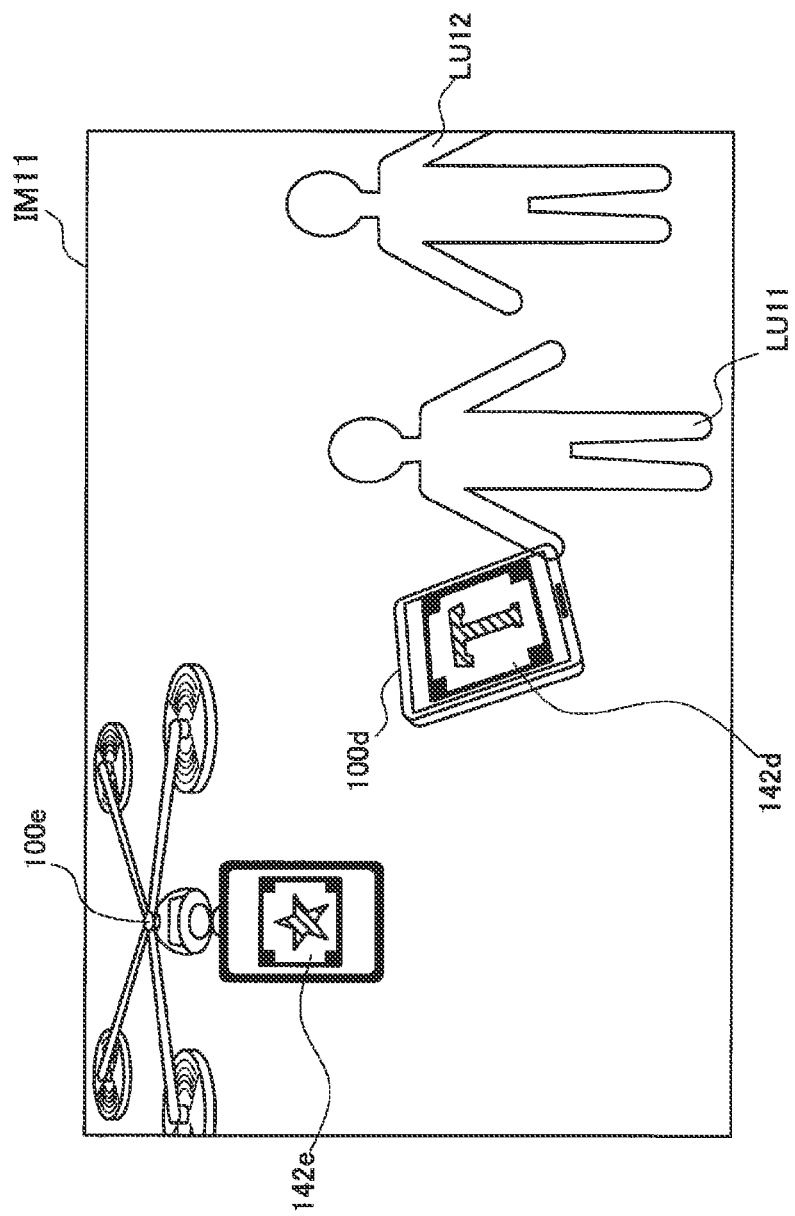
FIG. 5 is an explanatory diagram illustrating how a video depicting a local environment appears on a local device.

In a first technique, the recognition unit 140 may recognize a nearby device by detecting a marker displayed by a nearby device in the video captured by the camera 101. FIG. 5 illustrates a situation in which two local devices 100d and 100e appear in an input image IM11, which is a frame constituting a video depicting the local environment 10. The local device 100d is displaying a marker 142d. The local device 100e is displaying a marker 142e. A marker detected by the recognition unit 140 may be a known figure, symbol, or character string, or may be a two-dimensional barcode. Information-concealing technology (such as steganography) may also be used to display a marker on the display 105 in a format that not perceived by the local user. In addition, a device image of each local device 100 learned in advance may also be used as the marker. The recognition unit 140 may identify a corresponding device based on an image of a detected marker, and recognize the identified device as a nearby device.

In a second technique, the recognition unit 140 may recognize a nearby device based on device information received from the nearby device via the short-range communication unit 113. For example, the recognition unit 140 of each local device 100 causes device information enabling nearby devices to recognize that the local device 100 is able to stream a video of the real space to be broadcast periodically from the short-range communication unit 113. The device information broadcast at this point may include a device ID of the local device 100 and other attribute information, for example. Subsequently, when device information broadcast from a nearby device in the same way is received by the short-range communication unit 113, the recognition unit 140 may recognize the device that transmitted the received device information as a nearby device.

The recognition unit 140, after recognizing a nearby device according to either of the above techniques (or another technique), notifies the remote terminal 200 of the presence of the recognized nearby device. Subsequently, if the remote user decides to change the streaming source device, the withdrawal notification discussed above may be received by the NW communication unit 111. The notification of a nearby device to the remote terminal 200 may also be performed indirectly via the management server 300. For example, the management server 300 may notify the remote terminal 200 of the presence of a nearby device capable of streaming a video after first validating the compatibility of the streaming protocol between the recognized nearby device and the remote terminal 200.

Note that the recognition of a nearby device may also be conducted by the remote terminal 200, rather than the recognition unit 140 of the local device 100. For example, the remote terminal 200 may recognize a nearby device to the local device 100 by detecting a marker appearing in a video streamed from the local device 100.

(14) Display Control Unit

While a video of the real space is being streamed to the remote terminal 200, the display control unit 150 causes the display 105 to display a user image of the remote user who is viewing that video. The image data for the user image of the remote user may be included in the streaming request received by the NW communication unit 111, or acquired from a database using the user ID of the remote user. In addition, the display control unit 150 may also cause the display 105 to display user attributes, such as a nickname of the remote user, together with the user image.

Figure 6:
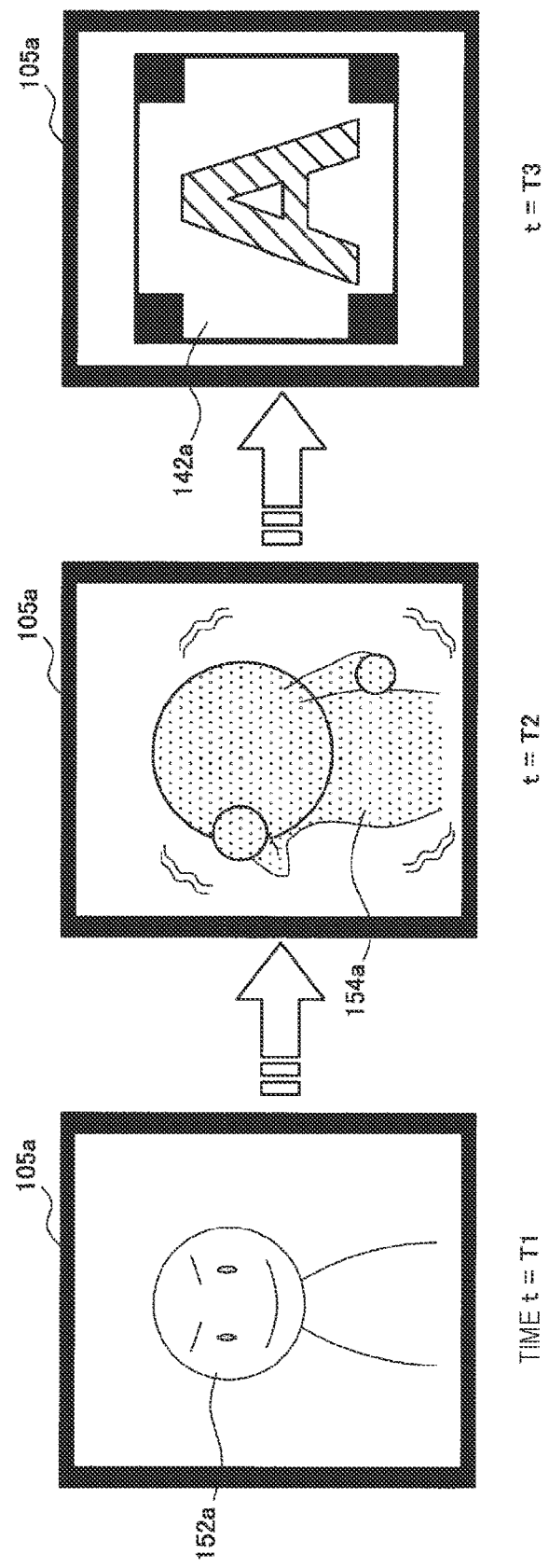
FIG. 6 is an explanatory diagram illustrating an example of display image transitions in a local device when a remote user transfers to a nearby device.

Additionally, when the streaming source device for video streaming to the remote terminal 200 is changed from the current device to a nearby device, the display control unit 150 may cause the display 105 to display an animation of the remote user transferring to the nearby device. FIG. 6 is an explanatory diagram illustrating an example of display image transitions in the local device 100 when the remote user transfers to a nearby device (in other words, the selected streaming source device is changed to a nearby device). At time t=T1, the local device 100a is the streaming source device, and as illustrated on the left side of FIG. 6, a user image 152a of the remote user is being displayed on the display 105a of the local device 100a. After that, suppose that the remote user changes the streaming source device to a nearby device 100e of the local device 100a. At time t=T2, there is displayed on the display 105a an image 154a constituting an animation as though the remote user is flying out from the local device 100a. After this animation ends, at time t=T3, the local device 100a is no longer the streaming source device, and a marker 142a is being displayed on the display 105a.

Figure 7:
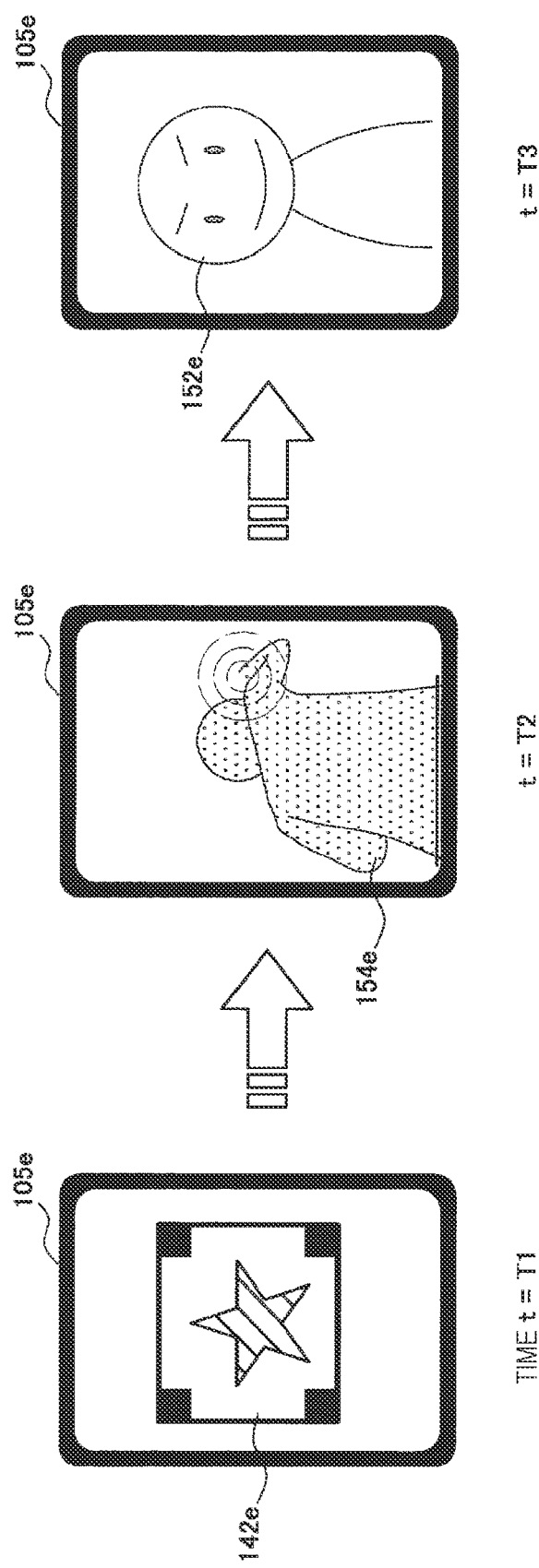
FIG. 7 is an explanatory diagram illustrating an example of display image transitions in a local device when a remote user transfers from a nearby device.

Additionally, when the streaming source device for video streaming to the remote terminal 200 is changed from a nearby device to the current device, the display control unit 150 may cause the display 105 to display an animation of the remote user transferring from the nearby device to the current device. FIG. 7 is an explanatory diagram illustrating an example of display image transitions in the local device 100 when the remote user transfers from a nearby device (in other words, the selected streaming source device is changed to the current device). At time t=T1, the local device 100e is a nearby device from the perspective of the streaming source device, which is another device. At this time, as illustrated on the left side of FIG. 7, a marker 142e is being displayed on the display 105e of the local device 100e. After that, suppose that the remote user changes the streaming source device to the local device 100e. At time t=T2, there is displayed on the display 105e an image 154e constituting an animation as though the remote user is going into the local device 100e. After this animation ends, at time t=T3, the local device 100e is the streaming source device, and a user image 152e of the remote user is being displayed on the display 105e.

Figure 8:
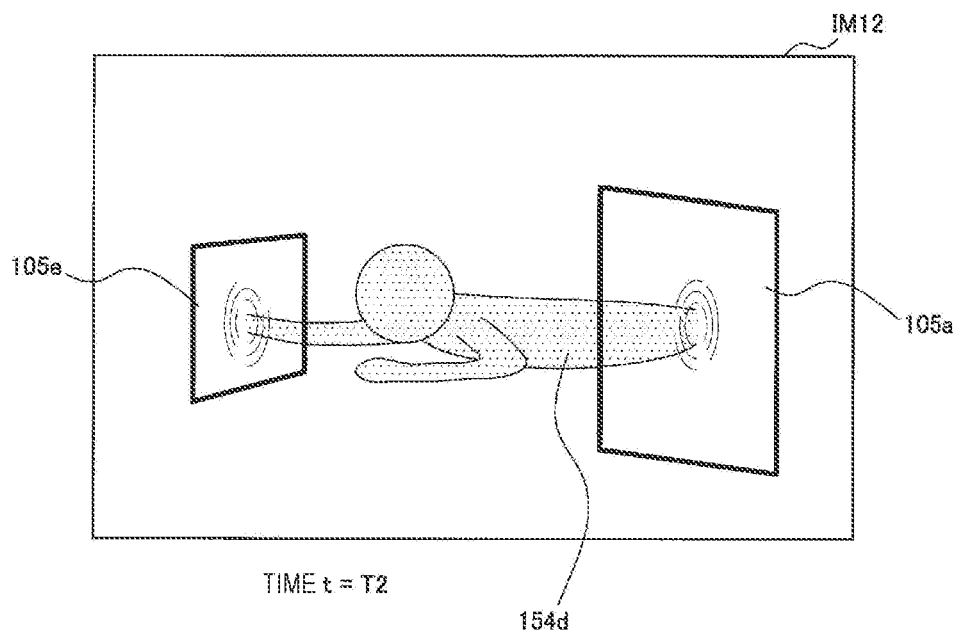
FIG. 8 is an explanatory diagram illustrating an example of a display image on a device that takes a picture of two devices when a remote user transfers between the two devices.

Other local devices 100 not involved in the change may also be notified of the change of streaming source device. If at least one of the streaming source device from before the change or after the change appears in an input image, the display control unit 150 of the local device 100 receiving such a notification may also cause the display 105 to display an animation of the remote user transferring between the two devices. FIG. 8 is an explanatory diagram illustrating an example of a display image on a local device 100 that takes a picture of two devices when a remote user transfers between the two devices. In the image IM12 illustrated in FIG. 8, the display 105a of the local device 100a and the display 105e of the local device 100e appear. The local device 100a is the streaming source device before the change. The local device 100e is the streaming source device after the change. In the image IM12 displayed at time t=T2, an image 154d constituting an animation as though the remote user is flying out from the local device 100a and going into the local device 100e is displayed.

By viewing animations like those illustrated as examples in FIGS. 6 to 8, the local user is able to recognize easily and intuitively which device among the local devices 100 the remote user is residing in (which device from which the remote user is viewing a video), and also from which device to which device the remote user transferred.

Figure 9:
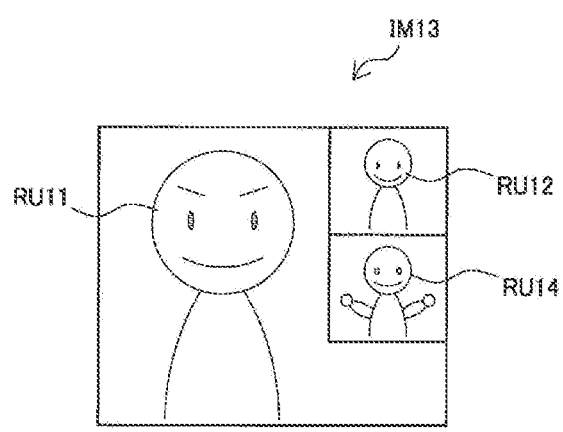
FIG. 9 is an explanatory diagram illustrating an example of a display image on a device in which multiple remote users are residing.

As FIGS. 6 and 7 demonstrate, the display control unit 150 causes the display 105 to display a user image of the remote user residing in the current device. If multiple remote users are residing in the current device, or in other words, if the video is being streamed to multiple remote terminals 200 respectively used by multiple remote users, the display control unit 150 may also cause the display 105 to display the user images of the multiple remote users, as illustrated in FIG. 9. In the example of FIG. 9, the display image IM13 is displaying the user images of remote users RU11, RU12, and RU14.

If a remote user is not residing in the current device, or if there is remaining capacity to accept a new remote user, the display control unit 150 may cause the display 105 to display the marker discussed above. The marker is used to enable nearby devices to recognize that the current device is capable of streaming a video of the real space. Note that in the case of using a device image of the exterior appearance of the local device 100 as the marker, the display control unit 150 may also not perform the marker display.

(15) Setting Unit

The setting unit 160 configures settings of the local device 100 according to user input from a local user present in the real space. For example, the setting unit 160 measures the current position of the local device 100 based on sensor data from the sensor module 115, and reports the positioning result to the management server 300. Additionally, the setting unit 160 configures whether or not to allow streaming of a video of the local environment 10 to the remote terminal 200, according to user input detected via the input unit 109. If streaming is not allowed, the streaming control unit 130 does not stream the video captured by the camera 101. The allowance or disallowance of streaming may be configured in arbitrary units, such as the address of the remote terminal 200, the user ID of the remote user, or a group to which the remote user belongs. For example, one user may be allowed to access all local devices 100, whereas another user may be allowed to access only local devices 100 of a specific type (for example, stationary devices). According to such settings, security risks caused by various remote users freely moving around the local environment 10 may be avoided.

(16) Movement Control Unit

The movement control unit 170 is a function block provided in the local device 100 in the case in which the local device 100 is a mobile device including the movement mechanism 119. The movement control unit 170 controls the movement mechanism 119 according to a movement control signal received from the remote terminal 200 during the period in which the remote user is residing in the local device 100. The movement control signal may be a signal instructing the local device 100 to go forward, go backward, accelerate, decelerate, change direction, or (if possible) ascend or descend, for example. Additionally, during the period in which the remote user is not residing in the local device 100, the movement control unit 170 may also control the movement mechanism 119 autonomously according to some kind of algorithm, so that the local device moves around the local environment 10.

If multiple remote users are residing in the local device 100 as described using FIG. 9 (that is, if the video captured by the camera 101 is being streamed to multiple remote terminals 200), there is a possibility that the movement control signals received from these remote terminals 200 may conflict with each other. For example, if two different remote users respectively instruct the same local device 100 to go forward and go backward at the same time, these instructions will conflict with each other. To resolve such conflicts, the movement control unit 170 may decide the motion of the local device 100 based on the movement control signal received from at least one of the multiple remote terminals 200, in accordance with a designated condition. Herein, the designated condition may be obeying control by a master user from among the multiple remote users, basing the decision on a majority vote by the multiple remote users, or pausing control when conflicting control instructions are given. In the example of FIG. 9, the user image of the master user, namely the remote user RU11, is displayed larger than the user images of the other remote users.

(17) Additional Function Unit

The additional function unit 190 provides additional functions to users, depending on the capabilities of the local device 100. The additional functions provided by the additional function unit 190 may include, for example, a graphic drawing function (a function of displaying, on the display 105, graphics drawn on the remote terminal 200 by the remote user). Also, the additional functions may include a content playback function (a function of playing back content on the local device 100 under remote control from the remote terminal 200). Note that these functions are merely examples, and other functions may also be provided by the additional function unit 190. A list of the additional functions providable by each local device 100 may be stated in the local device data, for example.

(18) Battery

In the case in which the local device 100 is a portable device or a mobile device, the local device 100 may be equipped with the battery 195. The battery 195 supplies operating power to each block in the drawings via power supply lines partially illustrated with dashed lines in FIGS. 3B and 3C. If the remaining battery level falls below a threshold value, the local device 100 may also switch to a power-saving mode. In the power-saving mode, the streaming control unit 130 may also pause video streaming. Also, in the power-saving mode, the movement of a mobile device may be prohibited.

[2-2. Remote Terminal]

Figure 10:
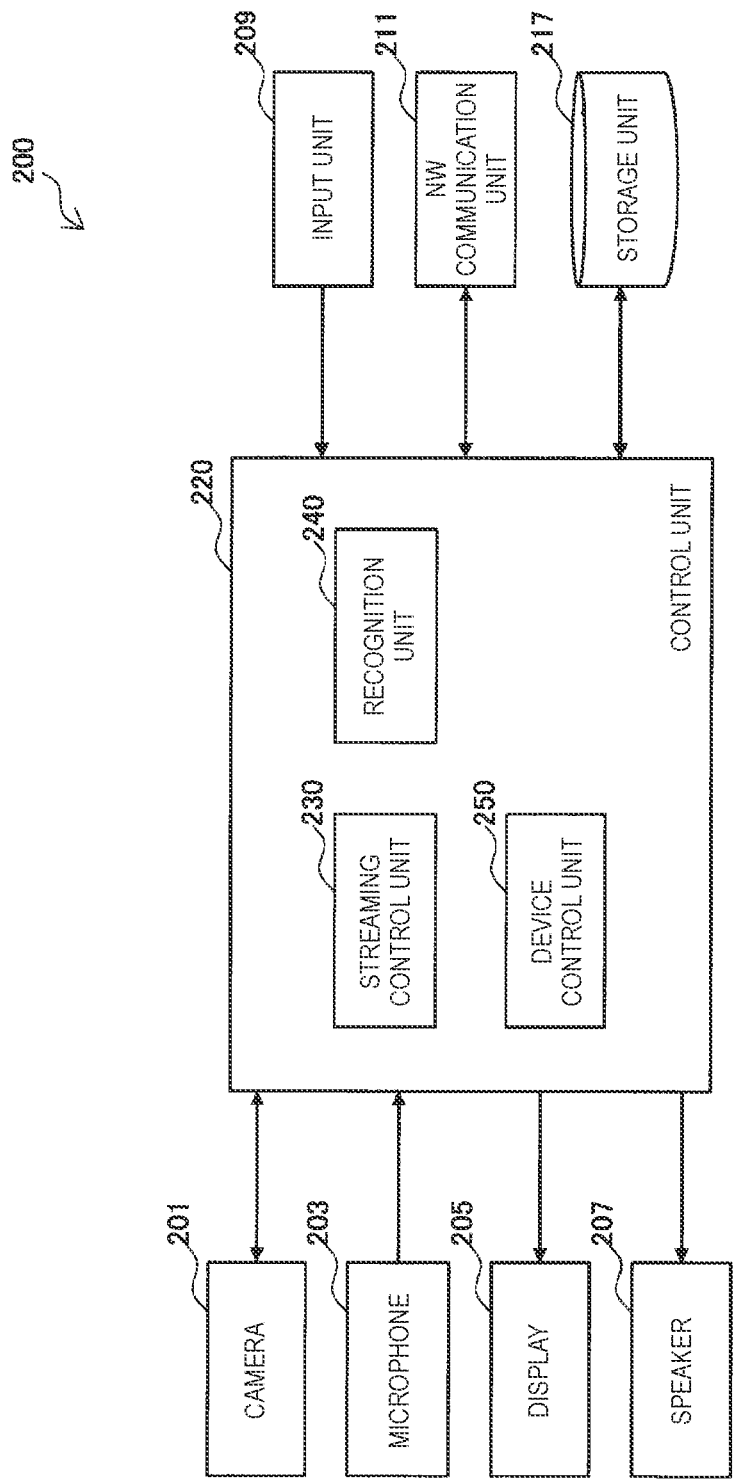
FIG. 10 is a block diagram illustrating an example of a configuration of a remote terminal.

FIG. 10 is a block diagram illustrating an example of a configuration of the remote terminal 200. Referring to FIG. 10, the remote terminal 200 is equipped with a camera 201, a microphone 203, a display 205, a speaker 207, an input unit 209, a NW communication unit 211, a storage unit 217, and a control unit 220. The control unit 220 may function as a streaming control unit 230, a recognition unit 240, and a device control unit 250.

(1) Camera

The camera 201 includes an image sensor such as a CCD or CMOS sensor, and captures images. Images captured by the camera 201 may include a user image of the remote user RU, for example. The camera 201 outputs an image signal expressing a captured image to the control unit 220.

(2) Microphone

The microphone 203 picks up audio emitted by the remote user, and generates an audio signal. The microphone 203 outputs the generated audio signal to the control unit 220.

(3) Display

The display 205 includes a screen realized by a LCD, OLED, CRT, or the like and a display circuit, and displays images. Images displayed by the display 205 may include graphical user interface (GUI) images discussed later, for example.

(4) Speaker

The speaker 207 includes a diaphragm and circuit elements such as an amp, and outputs audio based on an audio signal input from the control unit 220.

(5) Input Unit

The input unit 209 is an input interface used in order for the remote user to operate the remote terminal 200 or input information into the remote terminal 200. The input unit 209 may also include a touch sensor integrated with the display 205, for example. Instead of (or in addition to) the above, the input unit 209 may also include other types of input interfaces, such as buttons, switches, a keyboard, a pointing device, or a keypad. Additionally, the input unit 209 may also include a voice recognition module that detects user input based on voice commands, or a gesture recognition module that detects user input based on gesture commands.

(6) NW Communication Unit

The NW communication unit 211 is a communication interface that executes communication on the network 20. The NW communication unit 211 may be a wired communication interface that supports a wired communication protocol such as Ethernet. Alternatively, the NW communication unit 211 may be a wireless communication interface that supports a wireless communication protocol such as LTE, WCDMA, WiMAX, or WLAN. The NW communication unit 211 may communicate with the multiple local devices 100 discussed earlier that respectively capture videos of a real space, either directly or via the management server 300.

(7) Storage Unit

The storage unit 217 is realized with a storage medium such as semiconductor memory or a hard disk, and stores programs and data used in processing by the remote terminal 200. The data stored by the storage unit 217 may include remote user data about the remote user who uses the remote terminal 200, for example. Note that some of the programs and data described in this specification may also be acquired from an external data source, rather than being stored in the storage unit 217.

(8) Control Unit

The control unit 220 may be a processor such as a CPU or DSP. The control unit 220 causes various functions of the remote terminal 200 to operate by executing a program stored in the storage unit 217 or another storage medium.

(9) Streaming Control Unit

The streaming control unit 230 causes the NW communication unit 211 to receive streaming data delivered from one streaming source device selected by the remote user from among multiple local devices 100 present in the local environment 10. Subsequently, the streaming control unit 230 uses the display 205 to play back video included in the streaming data. The video played back at this point is a video depicting the real space of the local environment 10. Additionally, the streaming control unit 230 may also use the speaker 207 to play back audio included in the streaming data. Additionally, the streaming control unit 230 may also execute streaming from the remote terminal 200 to the streaming source device. The streaming data streamed from the remote terminal 200 may include images captured by the camera 201 and audio picked up by the microphone 203. Streaming between the remote terminal 200 and the streaming source device may be conducted directly, or may be relayed by the management server 300.

(10) Recognition Unit

The recognition unit 240 recognizes one or more nearby devices of the streaming source device appearing in video played back by the streaming control unit 230. Herein, a nearby device refers to a local device 100 capable of streaming to the remote terminal 200 a video of the real space from a viewpoint different from the currently playing video. For example, the recognition unit 240 may recognize a nearby device by detecting the above-discussed marker displayed by a nearby device in a video that is played back. The recognition unit 240 may identify a corresponding device based on an image of a detected marker, and recognize the identified device as a nearby device. Subsequently, the recognition unit 240 notifies the device control unit 250 discussed later of the presence of the recognized nearby device. Note that the recognition of a nearby device may also be conducted entirely by the recognition unit 140 of the local device 100. In this case, the recognition unit 240 may be omitted from the configuration of the remote terminal 200.

(11) Device Control Unit

The device control unit 250 presents the remote user with information about local devices 100 in the local environment 10 that are capturing video streamable to the remote terminal 200, enabling the remote user to select a streaming source device. The streaming source device when the remote user logs in to the information processing system 1 may be selected by the remote user at every login, or be a default device set in advance. After a streaming source device is selected, the device control unit 250 causes the streaming control unit 230 to play back video received from the selected streaming source device. Additionally, while video from the streaming source device is being played back by the streaming control unit 230, the device control unit 250 causes the display of the streaming source device to display a user image of the remote user.

Once a streaming source device has been selected, if one or more nearby devices are recognized by the recognition unit 240 or the recognition unit 140 of the streaming source device, the device control unit 250 asks the remote user about whether to change the streaming source device to one of the nearby devices. Asking the remote user may be performed via a GUI displayed by the display 205, or via audio output by the speaker 207. When asking the user whether to change the streaming source device, the device control unit 250 may also present the remote user with information related to the functionality of recognized nearby devices.

Figure 11:
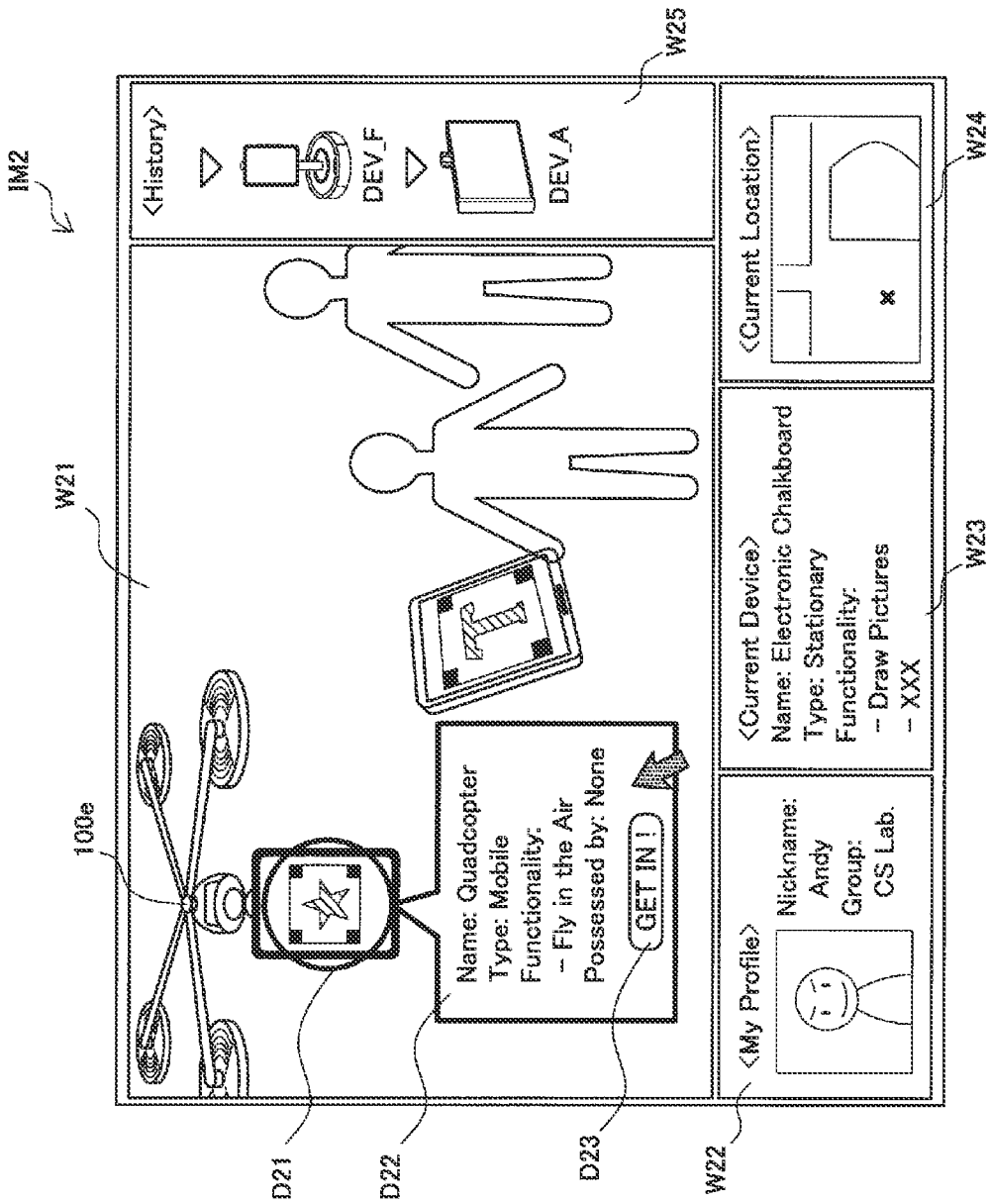
FIG. 11 is an explanatory diagram illustrating an example of a GUI that may be displayed on a remote terminal.

FIG. 11 is an explanatory diagram illustrating an example of a GUI that may be displayed on the remote terminal 200. Referring to FIG. 11, a GUI image IM2 that may be generated by the device control unit 250 is illustrated. The GUI image IM2 includes a streaming window W21, a profile window W22, a device information window W23, a location window W24, and a history window W25. The streaming window W21 displays video played back by the streaming control unit 230. In the example of FIG. 11, the local device 100e appears in the video received from the streaming source device. The profile window W22 displays a profile of the remote user. In the example of FIG. 11, a user image of the remote user (the same image as the one displayed on the display of the streaming source device), a nickname, and the name of a group to which the remote user belongs are being displayed in the profile window W22. The device information window W23 displays information related to the currently selected streaming source device. In the example of FIG. 11, the name, type, and functionality of the local device 100a are being displayed by the device information window W23. Such information may be provided to the remote terminal 200 from the management server 300 (or from the streaming source device), for example. The location window W24 displays a map indicating the current position in the local environment 10 of the selected streaming source device. The history window W25 displays a history of streaming source device selections, or in other words, a list of previously selected streaming source devices.

In the streaming window W21 of FIG. 11, display objects D21 and D22 are overlaid. The display object D21 points out the marker of the local device 100e detected in the video being streamed. The local device 100e is a nearby device of the streaming source device. The display object D22 is an information area displaying device information about the local device 100e recognized as a nearby device. In the example of FIG. 11, the name, type, and functionality of the local device 100e are being displayed by the display object D22. In addition, the display object D22 may also indicate information about a user residing in the local device 100e. However, in the example of FIG. 11, there are no users residing in the local device 100e ("None"). Furthermore, the display object D22 includes a button D23. The remote user, by pressing the button D23 via the input unit 209 (such as clicking or tapping), is able to select the local device 100e as the new streaming source device.

After a new streaming source device is selected by the remote user via such GUI image, the device control unit 250 transmits a device change request to the management server 300, for example. The management server 300, in response to receiving the device change request from the remote terminal 200, may transmit a streaming request to the local device 100 selected as the new streaming source device, and may transmit a withdrawal notification to the current streaming source device. Alternatively, the device control unit 250 may also transmit the streaming request and the withdrawal notification directly to the respective destination local devices 100. Note that if a device displayed in the history window W25 is specified by the remote user, the device control unit 250 may change the streaming source device to the specified device.

If the streaming source device is a mobile device including a movement mechanism, while video from the streaming source device is being played back, the device control unit 250 may also generate a movement control signal for controlling the movement of the streaming source device according to user input from the remote user. As discussed earlier, the movement control signal may be a signal instructing the streaming source device to go forward, go backward, accelerate, decelerate, change direction, or (if possible) ascend or descend, for example. The movement control signal generated by the device control unit 250 may be transmitted to the streaming source device over the network 20 via the NW communication unit 211. For example, the remote user, after transferring to a mobile device, is able to move the mobile device to a location where communication between local users is taking place (the movement in this case is not virtual), and participate in the communication. Additionally, after moving the mobile device near another local device 100, the remote user is also able to transfer further to the other local device 100.

[2-3. Management Server]

Figure 12:
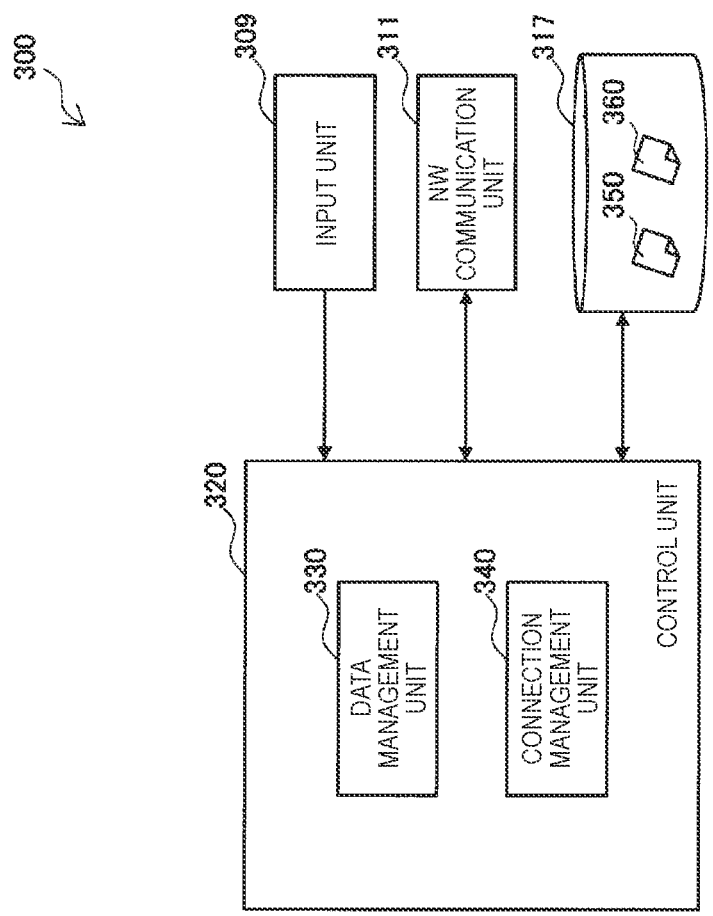
FIG. 12 is a block diagram illustrating an example of a configuration of a management server.

FIG. 12 is a block diagram illustrating an example of a configuration of the management server 300. Referring to FIG. 12, the management server 300 is equipped with an input unit 309, a NW communication unit 311, a storage unit 317, and a control unit 320. The control unit 320 may function as a data management unit 330 and a connection management unit 340.

(1) Input Unit

The input unit 309 is an input interface used in order for an operator to operate the management server 300 or input information into the management server 300. The input unit 309 may include arbitrary types of input interfaces, such as buttons, switches, a keyboard, a pointing device, or a keypad.

(2) NW Communication Unit

The NW communication unit 311 is a communication interface that executes communication on the network 20. The NW communication unit 311 may be a wired communication interface or a wireless communication interface. The NW communication unit 311 may communicate with the multiple local devices 100 and the remote terminal 200 discussed earlier.

(3) Storage Unit

The storage unit 317 is realized with a storage medium such as semiconductor memory or a hard disk, and stores programs and data used in processing by the management server 300. The data stored by the storage unit 317 may include local device data 350 and remote user data 360 discussed later, for example.

(4) Control Unit

The control unit 320 may be a processor such as a CPU or DSP. The control unit 320 causes various functions of the management server 300 to operate by executing a program stored in the storage unit 317 or another storage medium.

(5) Data Management Unit

The data management unit 330 has a role of acting as a manager that manages data stored by the storage unit 317. When a new local device 100 is deployed in the local environment 10, the data management unit 330 adds a record corresponding to the device in the local device data 350. Additionally, when a new remote user is registered, the data management unit 330 adds a record corresponding to the user in the remote user data 360. Additionally, the data management unit 330 keeps the content of this data in the latest state through the exchange of messages with the local devices 100 and the remote terminal 200.

FIG. 13 is an explanatory diagram illustrating an example of a structure of the local device data 350 managed on the management server 300. Referring to FIG. 13, the local device data 350 includes data fields for device ID 351, name 352, type 353, functionality 354, address 355, position 356, access rights 357, and status 358. The device ID 351 is an identifier that uniquely identifies each device. The name 352 expresses a name given to each device. The type 353 expresses the device type of each device. As a non-limiting example, the device type may be any of the three types of "Stationary", "Portable", and "Mobile". The functionality 354 is a data field stating a list of additional functions providable by each device. The address 355 expresses a destination address to be inserted into messages transmitted to each device (for example, an IP address or a MAC address). The position 356 expresses coordinates indicating the current position of each device. The data management unit 330 may update the corresponding position coordinates based on a positioning result report received periodically from each device, for example. The access rights 357 state access rights information for managing remote user access to each device. In the example of FIG. 13, access to the devices with the device IDs "DEV_A" and "DEV_C" is granted to all users ("All Users"). On the other hand, access to the device with the device ID "DEV_F" is granted only to users belonging to a specific group ("Group A"). Such access rights information may be preregistered by the operator of the management server 300, or registered dynamically through the setting unit 160 of each local device 100. The status 358 expresses the operating status of each device.

The data management unit 330 provides a subset of the above local device data 350 to the remote terminal 200. In the device information window W23 of the GUI image IM2 described using FIG. 11, a subset about the streaming source device is displayed as device information. In the display object D22, a subset about the nearby device is displayed as device information to assist in the selection of a new streaming source device by the remote user.

Figure 14:
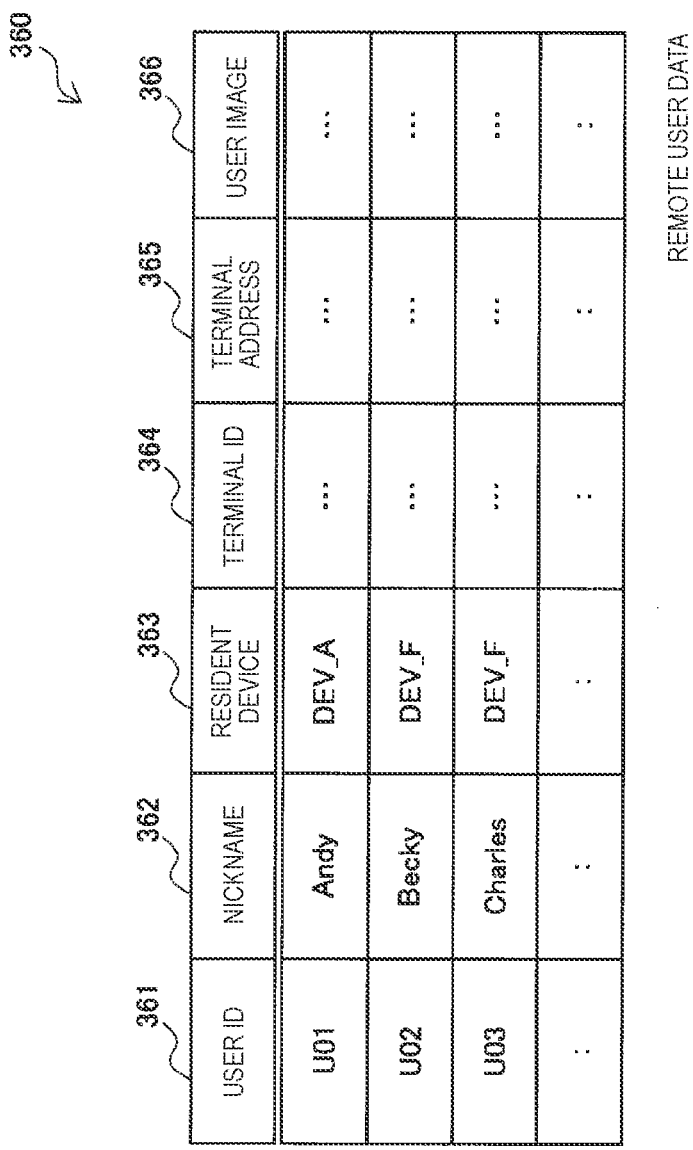
FIG. 14 is an explanatory diagram illustrating an example of a structure of remote user data managed on a management server.

FIG. 14 is an explanatory diagram illustrating an example of a structure of the remote user data 360 managed on the management server 300. Referring to FIG. 14, the remote user data 360 includes data fields for user ID 361, nickname 362, resident device 363, terminal ID 364, terminal address 365, and user image 366. The user ID 361 is an identifier that uniquely identifies each remote user. The nickname 362 expresses a nickname given to each remote user. The resident device 363 expresses a device ID of the streaming source device currently selected by each remote user. The data management unit 330 may update the resident device 363 ever time a remote user transfers from one device to another device. The terminal ID 364 is an identifier that identifies the remote terminal 200 being used by each remote user. The terminal address 365 expresses an address of the remote terminal 200 being used by each remote user (for example, an IP address or a MAC address). The user image 366 is a data field that stores image data of a user image for each remote user.

(6) Connection Management Unit

The connection management unit 340 manages connections between local devices 100 and remote terminals 200. The connection management unit 340 receives a login request from the remote terminal 200, and if the remote user is successfully authenticated, approves the login request, for example. Remote user authentication may be simple authentication based on information such as an ID and a password, or the IP address of the terminal, or may be more advanced authentication based on information such as an encryption key. The connection management unit 340 decides an initial device to act as the first streaming source device for the remote user whose login is approved, and transmits a streaming request to the decided initial device. The streaming request may include remote user data about the remote user who is to view the streamed video. The initial device may be a specific local device 100 in the local environment 10, or a local device 100 predefined for each remote user. Alternatively, the remote user may also select the initial device.

If a nearby device of an already-selected streaming source device is selected by the remote user as the new streaming source device, the connection management unit 340 transmits a streaming request to the new streaming source device in response to a device change request that may be received from the remote terminal 200. The connection management unit 340 may also verify the compatibility of the protocol between the nearby device and the remote terminal 200 before coordinating the new connection. Additionally, the connection management unit 340 may also verify whether or not access to the nearby device from the remote terminal 200 is allowed, based on the access rights information for the nearby device. The connection management unit 340 may transmit a withdrawal notification to the streaming source device from before the change.

If the streaming request is approved, the connection management unit 340 transmits the local device data of the streaming source device that approved the request to the remote terminal 200. After that, the streaming of video (and audio) from the streaming source device to the remote terminal 200 is started. In addition, a user image of the remote user is displayed on the streaming source device. The connection management unit 340 may also relay the streaming data transmitted from the streaming source device to the streaming destination remote terminal 200.

<3. Process Flows>

[3-1. Login to System]

Figure 15:
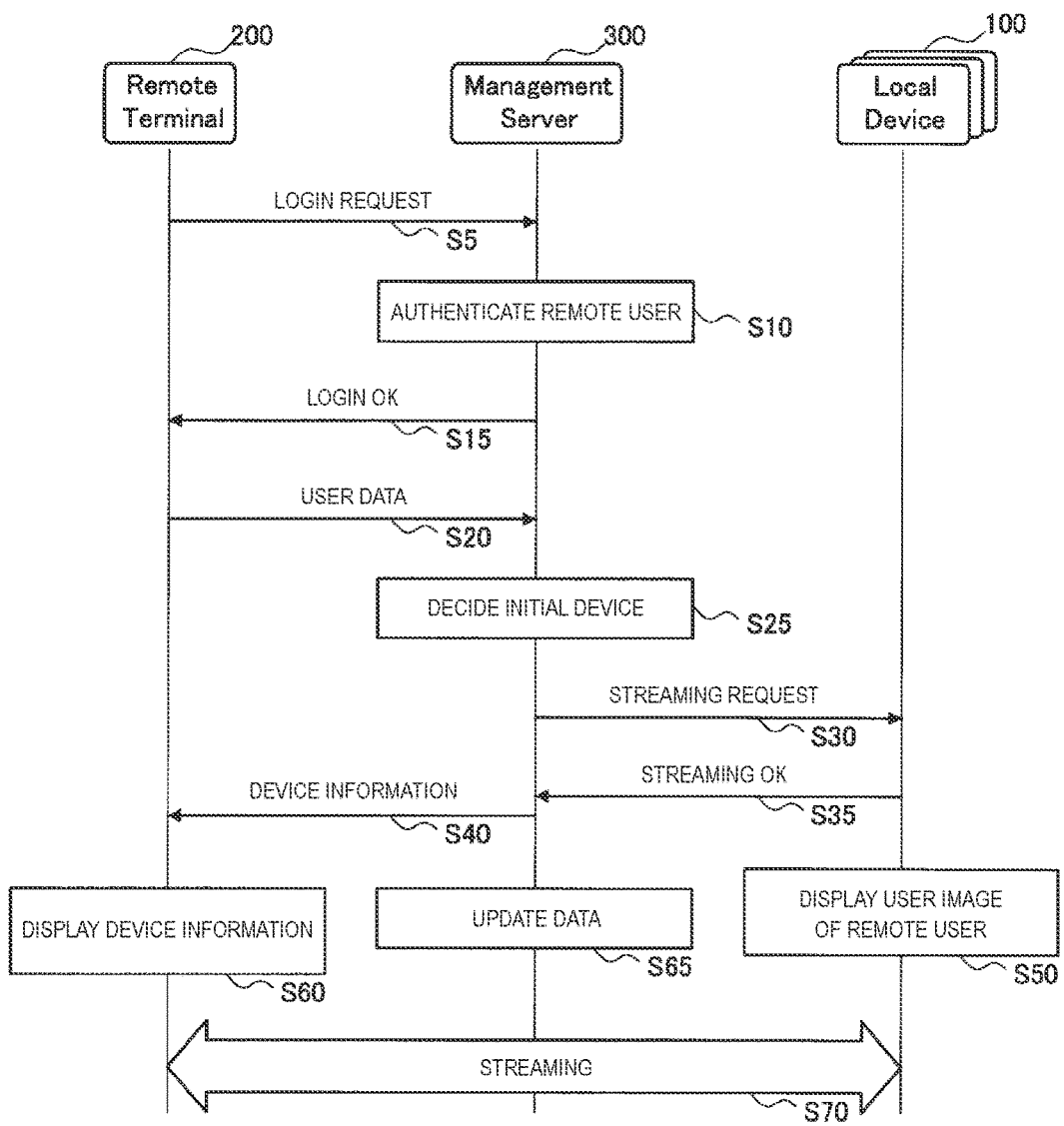
FIG. 15 is a sequence diagram illustrating an example of a flow of information processing during login of a remote user into a system.

FIG. 15 is a sequence diagram illustrating an example of a flow of information processing during login of a remote user into a system.

Referring to FIG. 15, first, the remote terminal 200 transmits a login request to the management server 300 (step S5). The management server 300 authenticates the remote user (step S10), and returns an authentication result to the remote terminal 200 (step S15). At this point, suppose that the authentication of the remote user is successful, and the login is approved. After the login is approved, the remote terminal 200 transmits user data to the management server 300 (step S20). The user data transmitted at this point may include the latest information about the remote user (such as a user image of the remote user taken during login, for example).

The management server 300 decides the initial device from among the multiple local devices 100 present in the local environment 10 for the remote user whose login is approved (step S25). Subsequently, the management server 300 transmits a streaming request to the decided initial device (step S30). The local device 100 decided as the initial device replies to the management server 300 with a response indicating whether or not streaming is available (step S35). At this point, suppose that the local device 100 determines that streaming is available (based on factors such as the capacity of the device, for example). If the management server 300 receives a response indicating that the streaming request has been accepted, the management server 300 transmits device information about the streaming source device (a subset of the local device data 350) to the remote terminal 200 (step S40).

The local device 100, after replying to the management server 300 with the response to the streaming request, causes its display to display a user image of the remote user (step S50). The remote terminal 200 causes its display to display the device information provided by the management server 300 (step S60). The management server 300 updates the data stored in the database (step S65). After that, the streaming of video (and audio) between the local device 100 and the remote terminal 200 is started (step S70).

[3-2. Transfer Between Devices]

FIG. 16 is a sequence diagram illustrating an example of a flow of information processing when a remote user transfers from a local device to a nearby device. Suppose that at the beginning of the sequence in FIG. 16, the local device 100a has been selected as the streaming source device. The local device 100e is a nearby device positioned near the local device 100a.

Referring to FIG. 16, first, the streaming of video (and audio) between the local device 100a and the remote terminal 200 is executed (step S100). After that, in the local device 100a or in the remote terminal 200, nearby devices of the local device 100a are recognized (steps S105a, S105*b*). The nearby device recognition results are reported to the management server 300. For a recognized nearby device, the management server 300 verifies the connectivity with the remote terminal 200 (for example, protocol compatibility, and whether or not access is allowed) (step S110). At this point, suppose that the local device 100*e* is recognized as a nearby device, the connectivity between the local device 100*e* and the remote terminal 200 is affirmed. The management server 300 transmits device information about the verified nearby device, namely the local device 100*e*, to the remote terminal 200 (step S115).

The remote terminal 200 causes its display to display the device information received from the management server 300, and asks the user whether to transfer to the local device 100*e* (in other words, whether to change the streaming source device to the local device 100*e*) (step S120). Subsequently, if user input giving instructions to change the streaming source device is detected (step S125), the remote terminal 200 transmits a device change request to the management server 300 (step S130). The management server 300, in response to receiving the device change request from the remote terminal 200, transmits a streaming request to the local device 100*e* (step S140). The local device 100*e* replies to the management server 300 with a response indicating whether or not streaming is available (step S145). At this point, suppose that the local device 100*e* determines that streaming is available. The management server 300 additionally transmits a withdrawal notification to the local device 100*a* (step S150). The local device 100*a* replies to the management server 300 with an acknowledgement (ACK) of the withdrawal notification (step S155). The management server 300, after receiving from the local device 100*e* a response indicating that the streaming request has been accepted, replies to the remote terminal 200 with a response indicating that the device change is allowed (step S160).

After that, the local device 100*e* that accepted the streaming request displays an animation of the remote user transferring to the device itself, as illustrated by example in FIG. 7 (step S165). Additionally, the local device 100*a* that received the withdrawal notification displays an animation of the remote user transferring from the device itself to a nearby device, as illustrated by example in FIG. 6. The animation of the remote user transferring to a nearby device additionally may be displayed on the remote terminal 200 (step S170).

After the display of the animation discussed above ends, the local device 100*e* causes its display to display a user image of the remote user (step S175). Meanwhile, the local device 100*a* removes a user image of the remote user from its display (step S176). The remote terminal 200 causes its display to display the device information about the local device 100*e* provided by the management server 300 (step S180). The management server 300 updates the data stored in the database (step S185). After that, the streaming of video (and audio) between the local device 100*e* and the remote terminal 200 is started (step S190). Meanwhile, the streaming between the local device 100*a* and the remote terminal 200 is stopped.

<4. Conclusion>

The foregoing thus describes an embodiment of technology according to the present disclosure in detail using FIGS. 1 to 16. According to the embodiment discussed above, multiple local devices that capture video of a real space in a local environment are deployed in the real space. Additionally, a local device selected by a remote user from among these multiple local devices is made to stream video captured by a camera of the device to a remote terminal used by the remote user, and while such streaming is being conducted, a user image of the remote user is displayed on the display of the device. Consequently, the remote user is able to view the state of the local environment from the viewpoint of a desired device from among various local devices present in the local environment. Meanwhile, a local user in the local environment is able to recognize, by looking at the user image being displayed on the local device, which viewpoint from which the remote user is viewing the state of the local environment. Additionally, the remote user is able to move the viewpoint flexibly from one local device to another local device, enabling face-to-face communication between the remote user and local users.

In addition, according to the embodiment discussed above, several local devices are realized as mobile devices including a movement mechanism. Furthermore, the movement mechanism of a mobile device is controlled according to a movement control signal received from a remote terminal. Consequently, by selecting a mobile device as the streaming source device, the remote user is able to control the mobile device while viewing video streamed from the mobile device, and freely move the viewpoint of the video around the local environment. For example, the remote user is able to move the mobile device to a location where desired communication peers are present (such as a conference room, for example), and conduct remote communication with the local users in that location.

In addition, according to the embodiment discussed above, the presence of a nearby device near the local device streaming video to the remote terminal is recognized in the remote terminal, or indicated in a notification from the local device to the remote terminal. Consequently, the remote user is able to serially change the streaming source device from the currently selected local device to a nearby device of the local device. By repeatedly changing the selection in this way, a unique user experience is provided, almost as though a ghost of the remote user is transferring freely from one device to another device in the local environment. When the streaming source device is changed, a display of the local device may display an animation of the remote user transferring between devices. In so doing, a local user is able to easily and intuitively recognize the movement of the viewpoint of the remote user. Consequently, it is possible to prevent a psychological burden on a local user which may arise due to a difficulty in knowing from where the remote user is looking.

In addition, according to the embodiment discussed above, when a nearby device is recognized, the remote terminal provides a GUI for asking the remote user whether or not the streaming source device should be changed to the nearby device. Through such a GUI, the remote user is able to select the streaming source device easily. The GUI provided by the remote terminal may present information related to the functionality of the nearby device to the remote user. In this case, the remote user is able to select a device with desired functionality as the streaming source device. For example, after first transferring to a mobile device, the remote user is able to search for a desired device by moving the viewpoint of the video around the local environment, and additionally transfer from the mobile device to a discovered desired device.

Further, a series of control processes by the respective devices described in the present description may be implemented using any one of software, hardware, and a combination of hardware and software. For example, a program configuring software is stored in a storage medium (a non-transitory medium) installed inside or outside each device. Further, for example, each program is read onto a Random Access Memory (RAM) at the time of execution and executed by a processor such as a Central Processing Unit (CPU).

Further, the processes described using sequence diagrams in the present description may not necessarily be executed in the order indicated by the sequence diagrams. Some process steps may be executed in parallel. Further, additional process steps may be employed, and some process steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification. Additionally, the present technology may also be configured as below.

(1)
An information processing device, including:
a camera that captures a real space;
a communication unit that communicates with a terminal device used by a remote user;
a streaming control unit that streams a first video captured by the camera from the communication unit to the terminal device if the information processing device itself is selected by the remote user from among a plurality of devices that capture the real space; and
a display that displays a user image of the remote user while the first video is being streamed to the terminal device.

(2)
The information processing device according to (1), further including:
a movement mechanism that causes the information processing device to move around the real space; and
a movement control unit that controls the movement mechanism according to a movement control signal received from the terminal device.

(3)
The information processing device according to (1) or (2), further including:
a recognition unit that recognizes a first nearby device in the real space that captures a second video streamable to the terminal device, wherein
if the first nearby device is recognized, the recognition unit notifies the terminal device of a presence of the first nearby device.

(4)
The information processing device according to (3), wherein
the recognition unit recognizes the first nearby device by detecting, in the first video, a marker displayed by the first nearby device.

(5)
The information processing device according to (3), wherein
the information processing device includes a short-range communication unit, and the recognition unit recognizes the first nearby device based on information received from the first nearby device through the short-range communication unit.

(6)
The information processing device according to any one of (3) to (5), wherein
when a streaming source device of video streaming to the terminal device is changed from the information processing device to the first nearby device, the display displays an animation of the remote user transferring to the first nearby device.

(7)
The information processing device according to any one of (1) to (6), wherein
if a streaming source device of video streaming to the terminal device is changed from a second nearby device in the real space to the information processing device, the streaming control unit causes the first video to be streamed to the terminal device.

(8)
The information processing device according to (7), further including:
a display control unit that causes the display to display a marker indicating that the information processing device is able to stream the first video.

(9)
The information processing device according to (7), further including:
a short-range communication unit that transmits information indicating that the information processing device is able to stream the first video.

(10)
The information processing device according to (7), wherein
when a streaming source device of video streaming to the terminal device is changed from the second nearby device to the information processing device, the display displays an animation of the remote user transferring from the second nearby device to the information processing device.

(11)
The information processing device according to any one of (1) to (10), further including:
a setting unit that sets whether or not to allow streaming of the first video to the terminal device, according to user input from a local user present in the real space.

(12)
The information processing device according to (2), wherein
if the first video is being streamed to a plurality of terminal devices respectively used by a plurality of remote users, the movement control unit decides a motion of the information processing device based on a movement control signal received from at least one of the plurality of terminal devices, according to a certain condition.

(13)
An information processing method executed by an information processing device provided with a camera that captures a real space and a communication unit that communicates with a terminal device used by a remote user, the information processing method including:
streaming a first video captured by the camera from the communication unit to the terminal device if the information processing device itself is selected by the remote user from among a plurality of devices that capture the real space; and
displaying a user image of the remote user on a display while the first video is being streamed to the terminal device.

(14)

A terminal device, including:

a communication unit that communicates with a plurality of devices that respectively capture a real space;

a streaming control unit that plays back a first video depicting the real space streamed from a device selected by a remote user using the terminal device from among the plurality of devices; and a device control unit that causes a display of the selected device to display a user image of the remote user while the first video is being played back by the streaming control unit.

(15)

The terminal device according to (14), wherein if a first nearby device in the real space that captures a second video streamable to the terminal device is recognized, the device control unit asks a user whether or not to change a streaming source device of video streaming to the terminal device to the first nearby device.

(16)

The terminal device according to (15), wherein when asking a user whether or not to change the streaming source device to the first nearby device, the device control unit presents information related to a functionality of the first nearby device to the remote user.

(17)

The terminal device according to (15) or (16), further including:

a recognition unit that recognizes the first nearby device appearing in the first video.

(18)

The terminal device according to (17), wherein the recognition unit recognizes the first nearby device by detecting, in the first video, a marker displayed by the first nearby device.

(19)

The terminal device according to any one of (14) to (18), wherein the plurality of devices includes at least one mobile device including a movement mechanism, and if the mobile device is selected as the streaming source device, the device control unit generates a movement control signal transmitted to the mobile device to control a movement of the mobile device, according to user input from the remote user.

(20)

An information processing method executed by a terminal device provided with a communication unit that communicates with a plurality of devices that respectively capture a real space, the information processing method including:

playing back a first video depicting the real space streamed from a device selected by a remote user using the terminal device from among the plurality of devices; and causing a display of the selected device to display a user image of the remote user while the first video is being played back.

REFERENCE SIGNS LIST 1 information processing system
10 local environment
20 network
100 information processing device (local device)
101 camera
105 display
111 network (NW) communication unit
113 short-range communication unit
119 movement mechanism
130 streaming control unit
140 recognition unit
150 display control unit
160 setting unit
170 movement control unit
200 terminal device (remote terminal)
211 network (NW) communication unit
230 streaming control unit
240 recognition unit
250 device control unit
300 management server

The invention claimed is:

1. A remote control device, comprising:
a communication unit configured to wirelessly communicate with at least one of a first device or a second device,
wherein each of the first device and the second device is configured to capture an image of a real space; and
at least one processor configured to:
receive a first video of the real space streamed from the first device;
control a display screen to display the first video as a streaming video;
recognize the second device based on an image recognition using the image of the real space captured by the first device;
control the display screen to ask a user of the remote control device whether to change the streaming video from the first video to a second video of the real space streamed from the second device;
request, when the user decides to change the streaming video from the first video to the second video, a management server of the first device and the second device to verify a connectivity to the second device;
change the streaming video from the first video to the second video when the management server has verified the connectivity to the second device; and
not change the streaming video from the first video to the second video when the management server has not verified the connectivity to the second device.

2. The remote control device according to claim 1, wherein the at least one processor is further configured to control the display screen to display information related to a functionality of the second device along with a user selectable option to change the streaming video from the first video to the second video of the real space streamed from the second device.

3. The remote control device according to claim 1, wherein
the image recognition is a marker-based image recognition, and
the at least one processor is configured to recognize the second device based on the marker-based image recognition using the image of the real space captured by the first device.

4. The remote control device according to claim 1, wherein the first device is a mobile device including a movement mechanism, and the at least one processor is further configured to:
generate a movement control signal to control the movement mechanism; and
transmit the generated movement control signal to the mobile device.

5. The remote control device according to claim 1, wherein the at least one processor is further configured to send an image of the user of the remote control device to the first device while controlling the first device.

6. An information processing method executed by a remote control device comprising a communication unit configured to wirelessly communicate with at least one of a first device or a second device, each of which is configured to capture an image of a real space, the information processing method comprising:
- receiving a first video of the real space streamed from the first device;
- controlling a display screen to display the first video as a streaming video;
- recognizing the second device based on an image recognition using the image of the real space captured by the first device;
- controlling the display screen to ask a user of the remote control device whether to change the streaming video from the first video to a second video of the real space streamed from the second device;
- requesting, when the user decides to change the streaming video from the first video to the second video, a management server of the first device and the second device to verify a connectivity to the second device;
- changing the streaming video from the first video to the second video when the management server has verified the connectivity to the second device; and
- not changing the streaming video from the first video to the second video when the management server has not verified the connectivity to the second device.

7. A server, comprising:
- a communication unit configured to wirelessly communicate with at least one of a first remote control terminal, a first device, or a second device,
    - wherein each of the first device and the second device is configured to capture an image of a real space; and
- at least one processor configured to:
    - receive a first video of the real space streamed from the first device;
    - send the first video, as a streaming video, to the first remote control terminal including a display screen;
    - receive, from the first device, information of the second device recognized by the first device, wherein the second device is recognized based on an image recognition using the image of the real space captured by the first device;
    - send the received information of the second device to the first remote control terminal;
    - receive, from the first remote control terminal, selection information to select the second device;
    - verify a connectivity of the server to the second device based on the selection information;
    - send, to the first remote control terminal, a second video of the real space streamed from the second device instead of the first video, when the connectivity to the second device is verified; and
    - not send the second video of the real space to the first remote control terminal when the connectivity to the second device is not verified.

8. The server according to claim 7, wherein
- the first device is a mobile device including a movement mechanism,
- the communication unit is further configured to wirelessly communicate with a second remote control terminal different from the first remote control terminal, and
- the at least one processor is further configured to:
    - send the first video to the second remote control terminal while sending the first video to the first remote control terminal;
    - determine one of the first remote control terminal and the second remote control terminal as a master user allowed to control the first device; and
    - receive, from the determined one of the first remote control terminal and the second remote control terminal, a movement control signal to control the movement mechanism.

9. The server according to claim 8, wherein the at least one processor is further configured to send a user image of the master user to the other one of the first remote control terminal and the second remote control terminal.

\* \* \* \* \*